US012653652B2

(12) United States Patent

Pellissard et al.

(10) Patent No.: US 12,653,652 B2
(45) Date of Patent: Jun. 16, 2026

(54) METHOD FOR ACQUIRING A MODEL OF A DENTAL ARCH

(71) Applicant: DENTAL MONITORING, Paris (FR)

(72) Inventors: Thomas Pellissard, Maisons-Alfort (FR); Guillaume Ghyselinck, Cantin (FR)

(73) Assignee: DENTAL MONITORING, Paris (FR)

( * ) Notice: Subject to any disclaimer, the term of this patent is extended or adjusted under 35 U.S.C. 154(b) by 0 days.

(21) Appl. No.: 18/562,928

(22) PCT Filed: May 24, 2022

(86) PCT No.: PCT/EP2022/064127

§ 371 (c)(1),
(2) Date: Nov. 21, 2023

(87) PCT Pub. No.: WO2022/248513

PCT Pub. Date: Dec. 1, 2022

(65) Prior Publication Data

US 2025/0127597 A1     Apr. 24, 2025

(30) Foreign Application Priority Data

May 25, 2021     (FR) ..................................... 21 05389

(51) Int. Cl.
*A61C 9/00*          (2006.01)
*A61C 7/00*          (2006.01)
(Continued)

(52) U.S. Cl.
CPC ............ *A61C 9/0053* (2013.01); *A61C 7/002* (2013.01); *G01S 17/89* (2013.01); *G06T 7/0012* (2013.01); *G06T 7/10* (2017.01); *G06T*

2200/04 (2013.01); *G06T 2200/08* (2013.01); *G06T 2207/20081* (2013.01); *G06T 2207/20084* (2013.01); *G06T 2207/30036* (2013.01)

(58) Field of Classification Search
CPC ......... A61C 9/0053; A61C 7/002; G06T 7/10; G06T 7/0012; G06T 2200/04; G06T 2200/08; G06T 2207/20081; G06T 2207/20084; G06T 2207/30036; G01S 17/89
USPC ........................................................ 382/128
See application file for complete search history.

(56) References Cited

U.S. PATENT DOCUMENTS 12,446,994 B2 * 10/2025 Salah ................... A61C 9/0046
2017/0325689 A1   11/2017 Salah
(Continued)

OTHER PUBLICATIONS

French Search Report Dated Feb. 25, 2022.
(Continued)

*Primary Examiner* — Allen H Nguyen
(74) *Attorney, Agent, or Firm* — IPSILON USA, LLP

(57) ABSTRACT

A method for acquiring a model of a dental arch of a user includes, at an update time, extra-oral acquisition, with a portable scanner, by the user, of a digital three-dimensional model of the arch. Optionally, the method includes a division of the model of the arch so as to isolate one portion of the model of the arch, so as to obtain an "updated model". The updated model thus possibly being the acquired model or the portion of the acquired model isolated by division, the object represented by the updated model being called the "updated object".

24 Claims, 8 Drawing Sheets

(51) Int. Cl.
    *G01S 17/89*        (2020.01)
    *G06T 7/00*        (2017.01)
    *G06T 7/10*        (2017.01)

(56) References Cited

U.S. PATENT DOCUMENTS

| | | | |
|---|---|---|---|
| 2021/0045858 A1 | 2/2021 | Salah | |
| 2021/0321872 A1* | 10/2021 | Saphier | A61B 5/004 |
| 2023/0149135 A1* | 5/2023 | Lipnik | A61C 9/0053 |
| | | | 433/214 |
| 2023/0248476 A1* | 8/2023 | Raslambekov | G16H 30/40 |
| | | | 705/2 |
| 2024/0164874 A1* | 5/2024 | Lipnik | G06T 7/00 |

OTHER PUBLICATIONS

International Search Report Dated Sep. 28, 2022.
"Insane Speed-Scanning with 3shape TRIOS intraoral scanner" 3shape—(Sep. 18, 2015).
"A knowledge-Based Algorithm for Automatic Monitoring of Othodontic Treatment: The Dental Monitoring System. Two Cases" Caruso Silvia et al. (Mar. 1, 2021).

\* cited by examiner

[Fig 1]
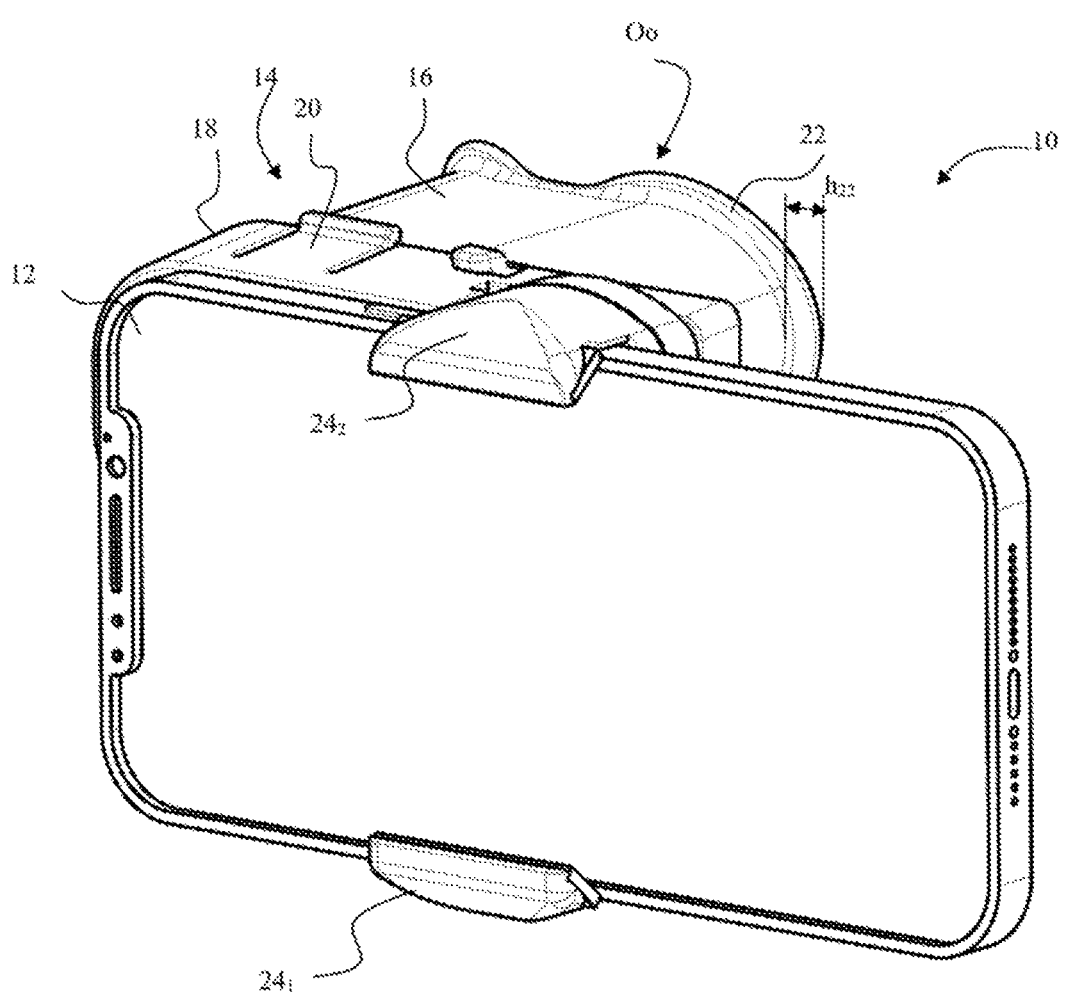

[Fig 2]
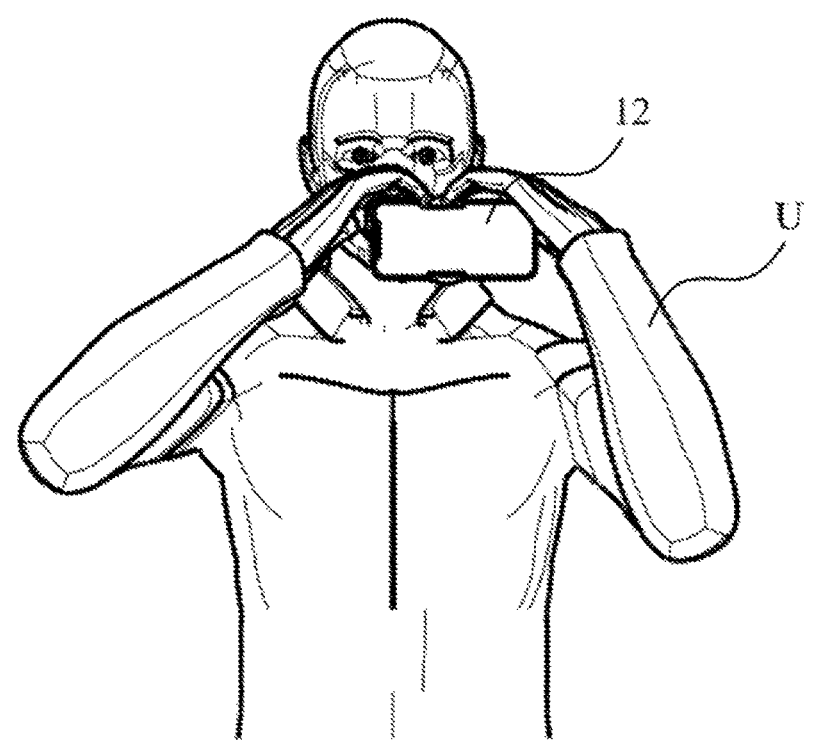
[Fig 3]

[Fig 4]
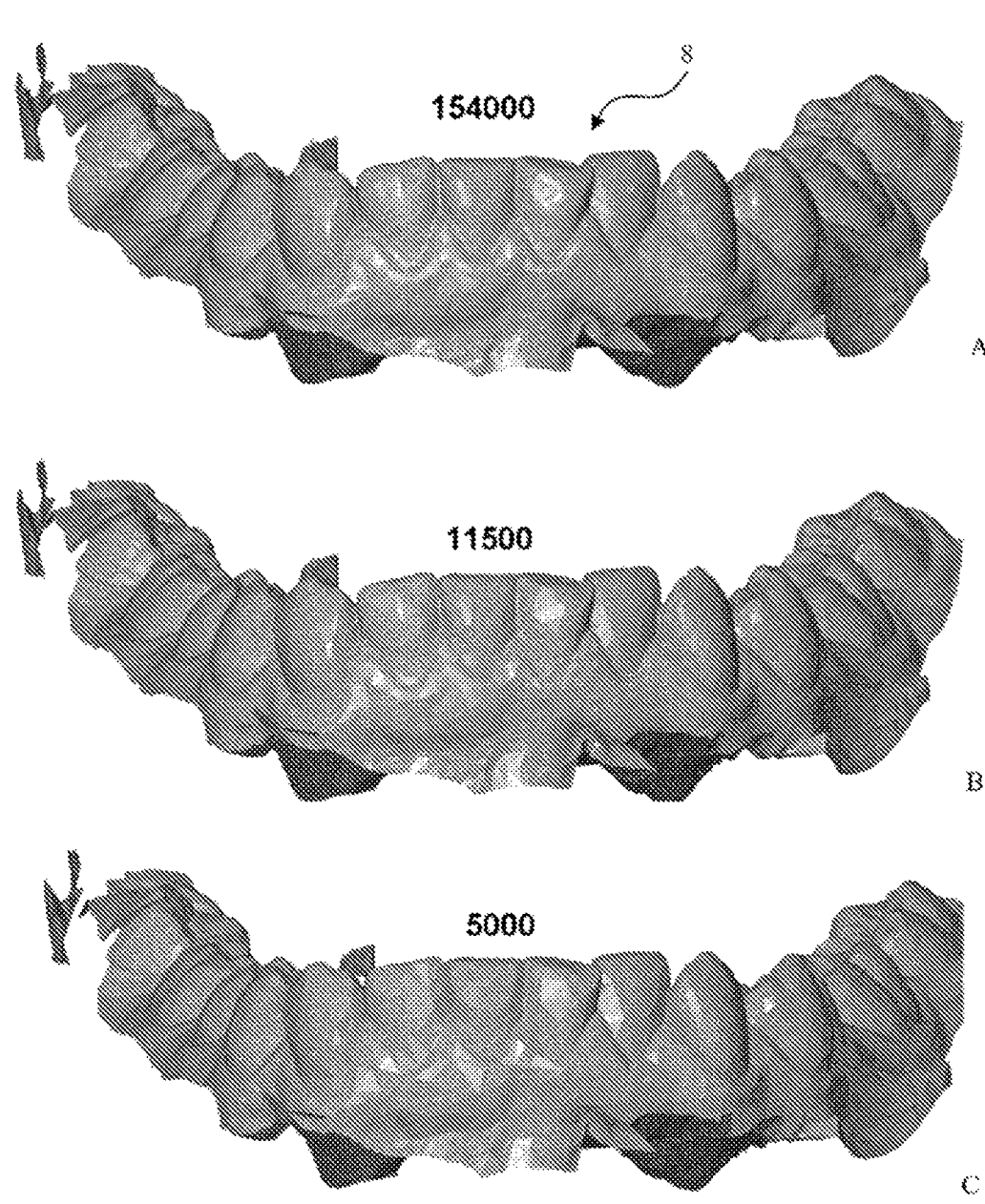

[Fig 5]
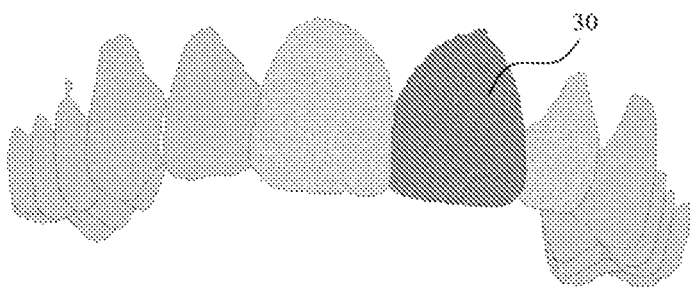
[Fig 6]
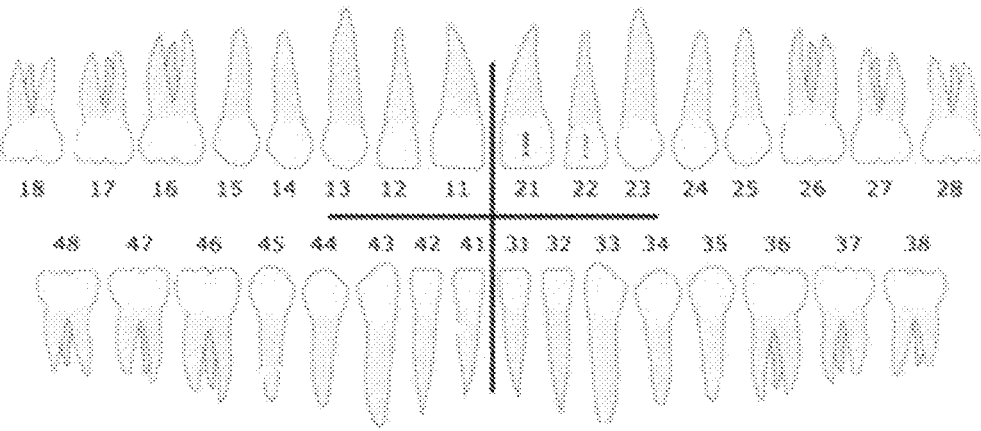
[Fig 7]
a) extraorally acquiring, using a portable scanner, on the part of the user, an updated model of the user's arch
b) determining at least one value of a dimensional parameter of the updated model, or "dimensional value", and preferably presenting it to the user
c) analyzing the dimensional value

[Fig 8]

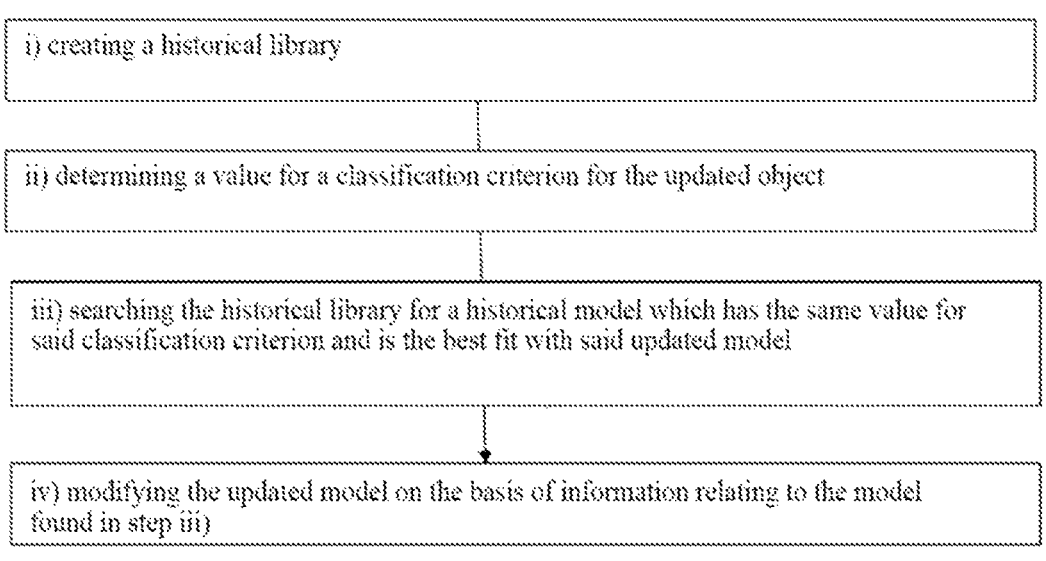

i) creating a historical library ii) determining a value for a classification criterion for the updated object iii) searching the historical library for a historical model which has the same value for said classification criterion and is the best fit with said updated model iv) modifying the updated model on the basis of information relating to the model found in step iii)

[Fig 9]

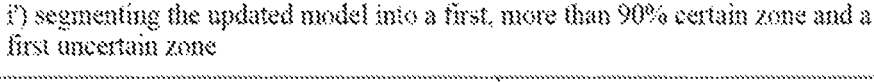

i') segmenting the updated model into a first, more than 90% certain zone and a first uncertain zone ii') segmenting the first uncertain zone into a second certain zone and a second uncertain zone, the second certain zone resulting from a comparison with a first reconstructed zone obtained by extrapolation of the first certain zone iii') replacing the second uncertain zone with a second reconstructed zone obtained by extrapolation of the first and second certain zones

[Fig 10]
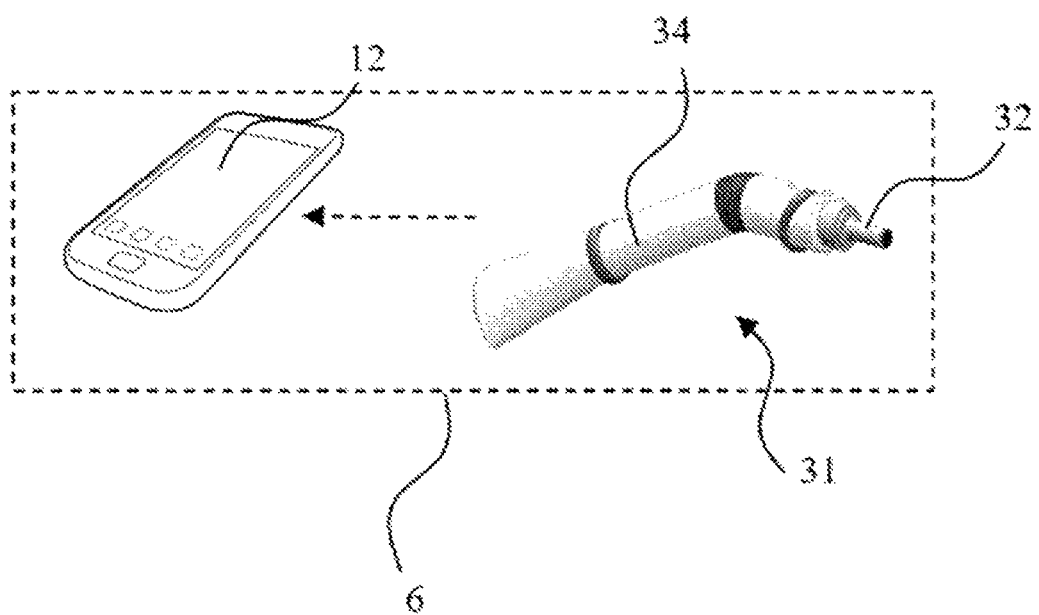

[Fig 11]
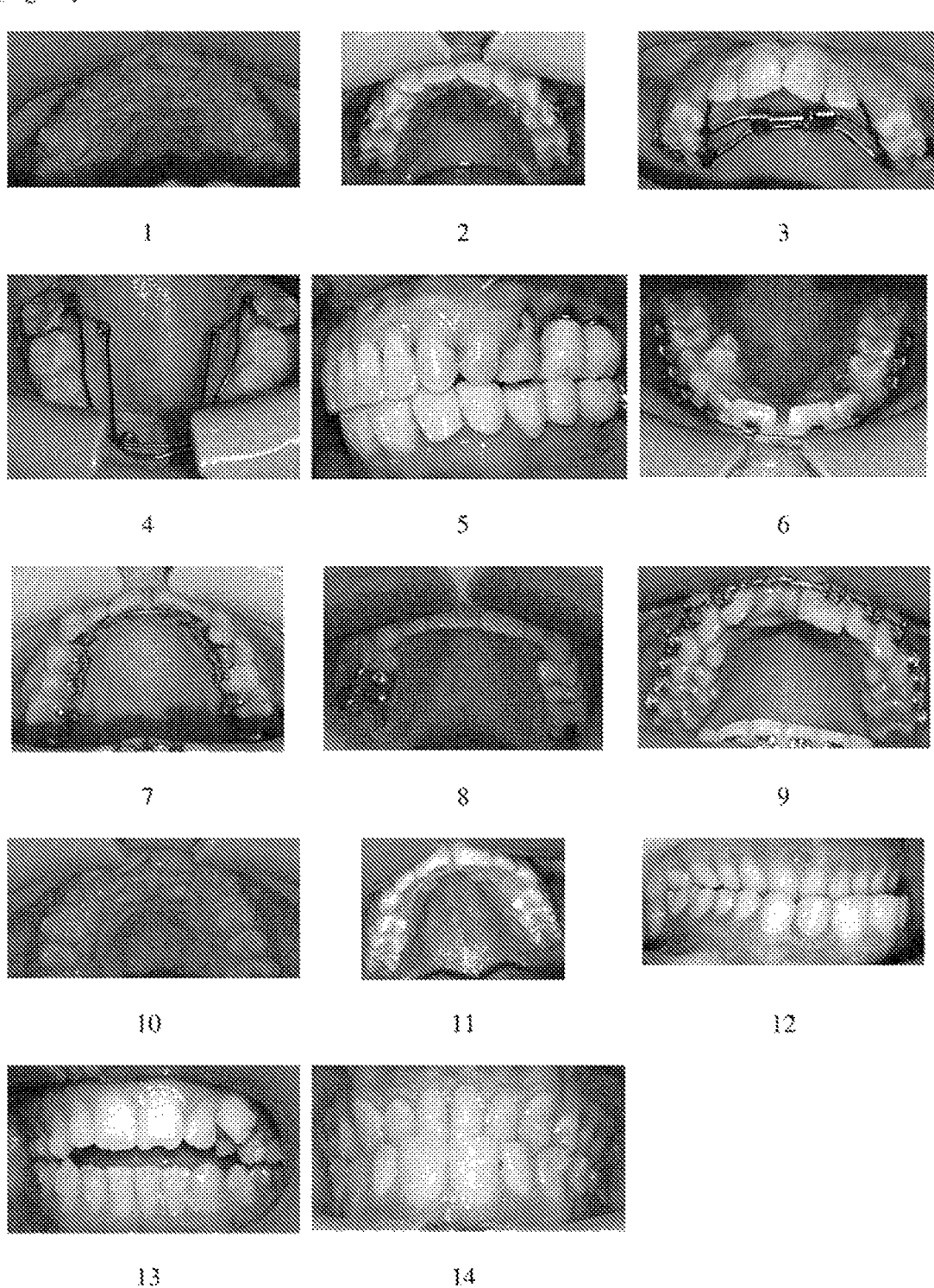

[Fig 12]
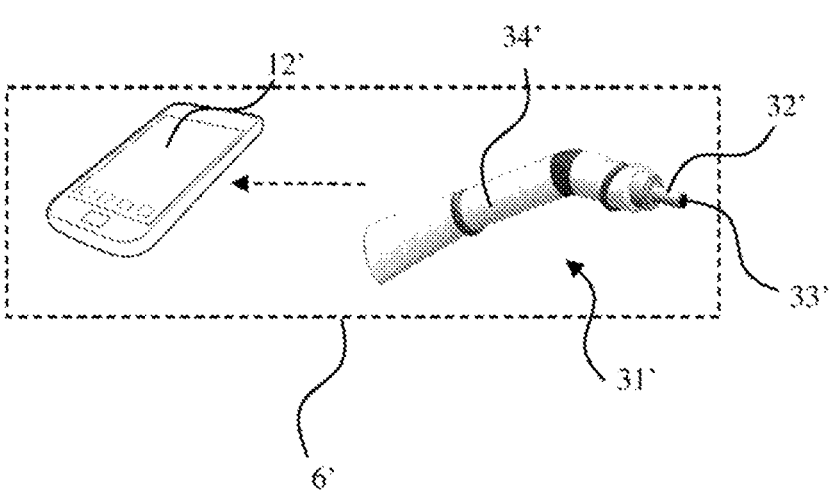

METHOD FOR ACQUIRING A MODEL OF A DENTAL ARCH

RELATED APPLICATION:

This application is a National Phase of PCT/EP2022/064127 filed on May 24, 2022, which claims the benefit of priority from French Patent Application No. 21 05389 filed on May 25, 2021, the entirety of which are incorporated by reference.

TECHNICAL FIELD

The present invention relates to a method for acquiring a model of a user's dental arch and to a computer program for implementing this method.

PRIOR ART

It is desirable for everyone to monitor their dentition on a regular basis, notably in order to check that the position and/or the shape and/or the appearance (or texture) of their teeth has not changed for the worse.

During an orthodontic treatment, this change for the worse can notably lead to the treatment being modified. After an orthodontic treatment, this change for the worse, referred to as "relapse", can lead to the treatment being repeated. Lastly, more generally and independently of any treatment, everyone might wish to monitor the possible movements and/or the change in shape and/or appearance of their teeth.

Conventionally, monitoring is performed by an orthodontist or a dentist, these individuals alone having suitable equipment available to them. This monitoring is therefore expensive. Moreover, visits are stressful. Lastly, the professional scanners that are available are accurate, but require a particular level of skill. They are conventionally used on the patient, for intraoral acquisition, or on a molding of the patient's arches, for extraoral acquisition.

Furthermore, U.S. Ser. No. 15/522,520 describes a method which makes it possible, on the basis of simple photographs of the teeth taken by the user at an updated instant, to accurately evaluate the movement and/or the deformation of the teeth from an initial instant. For this purpose, at the initial instant, a digital three-dimensional model of the user's dental arch is produced, preferably using a professional scanner. This initial model is then segmented so as to define a tooth model for each tooth. Lastly, the tooth models are moved so as to transform the initial model of the dental arch such that it matches the photographs as best as possible. This method makes it possible to obtain a model representing the arch at the updated instant with excellent accuracy, without the user needing to travel for a scan of their teeth. This model can then be compared to the initial model to monitor the positioning and/or the shape of the user's teeth.

This method is practical for the user, but requires at least one appointment to acquire the initial model of the arch. It then requires laborious data processing to segment and then deform the initial model.

There is thus a need for a method for monitoring the dental situation of a user remotely, as described in U.S. Ser. No. 15/522,520, but which is more practical still for the user and can be implemented more quickly.

One aim of the present invention is to at least partially address this problem.

SUMMARY OF THE INVENTION

The invention provides a method for acquiring a model of at least one dental arch of a user, said method comprising the following steps:

a) at an updated instant, acquiring, preferably extraorally, using a portable scanner and on the part of the user, a digital three-dimensional model of said arch, or "acquired model", and optionally segmenting the acquired model so as to isolate a portion of the model of the arch, preferably a tooth model, so as to obtain an "updated model", the updated model possibly thus being the acquired model or the portion of the acquired model that was isolated by segmentation, the object represented by the updated model being referred to as "updated object".

As will be seen in more detail in the rest of the description, the inventors have discovered that it is possible to use a portable scanner to produce, preferably extraorally and without taking any particular precaution, a model of an arch or of a tooth of high enough quality to be utilized in orthodontics. Such a method appears to be incompatible with the acquisition of a sufficiently complete and accurate model.

Advantageously, the acquisition can be performed by the user themselves, this opening up a wide range of applications. In particular, the acquisition no longer requires travel to a dental healthcare professional. Moreover, a method according to the invention makes it possible to analyze the user's dental situation more quickly than is the case according to the methods of the prior art. Notably, it is not necessary to construct an arch model from photos.

In general, 3D models of dental arches are conventionally acquired intraorally, using a 3D optical scanner, with intraoral acquisition allowing the sensor to be very close to the arch, and therefore to provide highly accurate information.

The extraoral (or "extrabuccal") acquisition devices, that is to say acquisition devices in which the acquisition sensor, in particular the sensor of a camera or of a photographic image capturing device, is not introduced into the user's mouth, are contemporary and use photos to deform an initial model obtained using a conventional 3D optical scanner. The data processing necessary for this deformation is expensive.

The inventors have succeeded in testing a, preferably extraoral, portable scanner, in particular a LIDAR, and discovering that such a scanner allows the patient to themselves acquire a good-quality model of their dental arches. Advantageously, it is not necessary for an initial model, for example at the start of an orthodontic treatment, to be acquired and then deformed on the basis of the images acquired by the scanner. The processing of the images acquired by the scanner specifically makes it possible, according to the techniques conventionally used for 3D optical scanners, to directly obtain a model of the dental arch.

In an advantageous embodiment, the portable scanner has low accuracy. This is because all that is needed is to record the spatial position of several notable points on the arch to form an updated model. Advantageously, the acquisition of a low-accuracy model is possible with limited and portable technical means. A low-accuracy model also does not need much memory in which to be stored. It can easily and quickly be sent remotely, for example by radio.

Preferably, the portable scanner is integrated in a cellphone for said extraoral acquisition, or comprises a cellphone and an acquisition tool comprising an acquisition head able to be introduced into the mouth of the user, who acquires the acquired model, preferably by means of a LIDAR, and sends it to the cellphone, or acquires a signal and sends it to the cellphone such that said cellphone generates the acquired model from said signal, autonomously or using a computer with which said cellphone communicates.

Preferably, the cellphone sends the acquired model and/or the updated model to a dental healthcare professional, preferably by radio, preferably at a distance greater than 100 m, or greater than 1 km, or greater than 10 km and/or less than 50 000 km from the user.

An analysis method according to the invention may also comprise one or more of the following optional features:

in step a), the updated model is subjected to data processing to correct it, the correction possibly comprising a modification of the updated model or a replacement of the updated model with a correction model;

in step a), the updated model is compared with a correction model so as to obtain a measure for a difference in shape between the updated model and the correction model, and then the updated model is modified so as to reduce said difference in shape, preferably so as to minimize said difference in shape, preferably by means of a metaheuristic method, in particular selected from the methods listed below, preferably by simulated annealing, or depending on said measure, the updated model is left unchanged or the updated model is replaced with the correction model;

in step a), the updated model is submitted to a neural network trained to make a digital three-dimensional model presented to it as input more realistic;

the updated object is said arch of the user or a tooth of said arch;

the correction model is a model which is obtained, at a different instant than the updated instant, by a scan of said updated object, or which shows said updated object with a theoretical shape, preferably resulting from a simulation, or a model of an object representative of a set of individuals, said object being of the same type as the updated object, preferably an arch or a tooth, for example a typodont or a tooth from a typodont;

the correction model is:

a model of the updated object that was obtained by a scan, preferably using the portable scanner or using a professional scanner, preferably at an instant more than 2 weeks, 4 weeks, 6 weeks, 2 months, 3 months and/or less than 12 months, or less than 6 months, before the updated instant, or a model of the updated object that simulates the shape of said updated object as anticipated for the updated instant and that preferably has been produced at an instant more than 2 weeks, 4 weeks, 6 weeks, 2 months, 3 months and/or less than 6 months before the updated instant, or a model of the updated object that simulates the shape of said updated object as anticipated for a "correction" instant, coming after or before the updated instant, the temporal interval between the updated instant and correction instant preferably being longer than one week, preferably longer than 2 weeks, 4 weeks, 6 weeks, 2 months and/or shorter than 6 months, said model preferably having been produced more than 2 weeks, more than 4 weeks, more than 6 weeks, more than 2 months or more than 3 months before the updated instant, or a historical model selected from a historical library comprising more than 1000 historical models representing objects of the same type as the updated model, said selection preferably being guided such that the selected historical model is the historical model which is the best fit in terms of shape with the updated model, or a model obtained by subjecting the historical models from said historical library to statistical processing, preferably such that the model obtained by statistical processing is representative of a population of individuals;

the historical library only comprises historical models meeting the same classification criterion as the updated model, for example those relating to individuals sharing at least one characteristic with the user, for example the same age and/or the same gender and/or the same pathology and/or following the same orthodontic treatment or a similar orthodontic treatment;

in step a), the updated model is corrected by entering the updated model as input into a neural network trained to correct models, preferably selected from the neural networks listed in the detailed description of step iv) below; and/or, in step a), the updated model is corrected by following the following steps:

i) creating a historical library comprising more than 1000, preferably more than 5000, preferably more than 10 000 historical models, each historical model modeling an object of the same type as the updated object, for example modeling an arch or a tooth if the updated model models an arch or a tooth, respectively, and attributing a value for a classification criterion to each historical model;

ii) analyzing the updated model, so as to determine the value of said classification criterion for the updated object;

iii) searching the historical library for a historical model that has the same value for said classification criterion and is the best fit with said updated model, or "optimum model";

iv) modifying the updated model on the basis of information relating to the optimum model, the modification possibly comprising a replacement of the updated model with the optimum model;

in step a), the acquired model is segmented so as to define a plurality of models of teeth, and then, for each tooth model considered to be an updated model, a cycle of steps i) to iv) is performed, wherein the optimum model determined in step iv) is disposed to as to replace said tooth model in the acquired model, this advantageously making it possible to reconstruct a highly accurate arch model from a low-accuracy acquired model;

in step a), the updated model is corrected by following the following steps:

i') defining:

a first certain zone formed by points on the updated model representing a portion of the patient, for example a tooth, with an accuracy greater than 90%, preferably greater than 95%, preferably greater than 99%, or "first certain points", and a first uncertain zone, constituting the remainder to 100% of the updated model;

ii') extrapolating the first certain zone, on the basis of the sole first certain zone, so as to define, in the region of the first uncertain zone, a first reconstructed zone, and then defining:

a second certain zone formed by points in the first uncertain zone that are spaced apart from the first reconstructed zone by a distance less than a threshold distance, or "second certain points"; and a second uncertain zone, constituting the remainder to 100% of the first uncertain zone;

iii') extrapolating the aggregate formed by the first and second certain zones, on the basis of the sole aggregate, so as to define, in the region of the second uncertain zone, a second reconstructed zone, and then replacing the second uncertain zone with the second reconstructed zone, so as to obtain a clean updated model;

in step a), the updated model is corrected by submitting the updated model to a trained neural network by supplying it with rough models of objects of the same type as the updated object as input, and said rough models made hyper-realistic as output;

in step a), the updated model is subjected to data processing in order to simplify it;

the portable scanner is integrated in a cellphone or comprises a cellphone and an acquisition tool comprising an acquisition head able to be introduced into the user's mouth, the acquisition tool communicating with the cellphone in order to send the acquired model or the updated model;

the acquisition head is connected to the cellphone, preferably in a Bluetooth® connection or by wires;

the cellphone is used to send the acquired model or the updated model by radio, preferably to a dental healthcare professional, and in particular to an orthodontist, and/or to a data processing center, preferably for the implementation of steps b) and/or c);

the portable scanner is a LIDAR, for "light detection and ranging";

in step a), the portable scanner projects a structured light directly onto the patient's teeth and acquires images that are different than photos;

in step a), the user modifies the angulation of the portable scanner, preferably by moving the portable scanner in relation to the patient's teeth, preferably horizontally and/or vertically, preferably with the mouth open and with the mouth closed;

in step a), the user moves their lips and/or their cheeks apart to make their teeth visible to the portable scanner, and then acquires the acquired model, preferably extraorally, that is to say without putting the portable scanner in their mouth, even partially;

preferably, the user utilizes a retractor and/or a support for the portable scanner to improve the quality of the acquired model;

in step a), the portable scanner is immobilized on a support comprising a rim, the rim being inserted between the user's lips and teeth;

the support comprises a tubular retractor which defines an oral opening, said rim extending around the periphery of the oral opening;

in step a), the user modifies the angulation of the portable scanner, preferably by moving the support in relation to the patient's teeth, preferably horizontally and/or vertically, preferably with the mouth open and with the mouth closed, keeping the rim of the support between the user's teeth and the user's lips;

in step a), the model acquired using the portable scanner is segmented so as to define a plurality of models of teeth, and then each of said tooth models is successively corrected and/or simplified, preferably as described above;

the method comprises, after step a), the following step:

b) determining at least one value of a dimensional parameter of the updated model, or "dimensional value", and/or of an appearance parameter of the updated model, or "appearance value";

in step b), more than two dimensional values, preferably enough dimensional values to define a spatial position of at least one point on the updated model, preferably more than 10, more than 100, more than 500 points on the updated model, are defined;

the dimensional parameter is selected from the following:

a dimension of the updated model;

a distance from a notable point on the updated model to a reference, preferably fixed in relation to the updated model, preferably a reference model disposed, like the updated model, in a standard configuration, and a parameter derived from one or more dimensions of the updated model and/or from one or more distances from one or more notable points on the updated model to said reference;

the appearance parameter is selected from the following: a color, a reflectance, a transparency, a reflectivity, a shade, a translucence, an opalescence, an indication as to the presence of tartar, plaque or food deposits on the tooth;

in order to determine said dimensional value, a distance between a point on the updated model and a reference model disposed, like the updated model, in a standard configuration is measured;

the reference model is preferably a model of the updated object that was obtained by a scan, preferably using the portable scanner or using a professional scanner, preferably at an instant more than 2 weeks, 4 weeks, 6 weeks, 2 months, 3 months and/or less than 6 months, before the updated instant, or a model of the updated object that simulates the shape of said object as anticipated for the updated instant and that preferably has been produced at an instant more than 2 weeks, 4 weeks, 6 weeks, 2 months, 3 months and/or less than 6 months before the updated instant, or a model of the updated object that simulates the shape of said object as anticipated for a reference instant, coming after or before the updated instant, the temporal interval between the updated instant and reference instant preferably being longer than one week, preferably longer than 2 weeks, 4 weeks, 6 weeks, 2 months and/or shorter than 6 months, said model preferably having been produced more than 2 weeks, more than 4 weeks, more than 6 weeks, more than 2 months or more than 3 months before the updated instant, or a historical model selected from a historical library comprising more than 1000, preferably more than 10 000, preferably more than 100 000 historical models representing objects of the same type as the updated object, said selection preferably being guided such that the selected historical model is the historical model which is the best fit in terms of shape with the updated model, or a model obtained by subjecting the historical models from said historical library to statistical processing, preferably such that the model obtained by statistical processing is representative of a population of individuals;

the method comprises, after step b), the following step:

c) using the dimensional value and/or the appearance value:

to detect or evaluate a position or a shape of a tooth and/or a change in position or shape of a tooth and/or a rate of change of a position or a shape of a tooth, and/or to detect or evaluate a position or a shape of an orthodontic appliance and/or a change in position or shape of an orthodontic appliance and/or a rate of change of a position or a shape of an orthodontic appliance, and/or to measure a change in shape of the teeth of the patient between two dates, and/or in dentistry;

in step c), the dimensional value and/or the appearance value is used to detect or evaluate a position or a shape of an instance of staining or decay:

following the eruption of a tooth, and/or detect a relapse or an abnormal position of a tooth, and/or detect the abrasion of a tooth, and/or monitor the opening or closure of at least one space between two teeth, and/or monitor the stability or modification of occlusion, monitor the movement of a tooth toward a predetermined position, and/or detect or evaluate the detachment of an orthodontic brace or aligner, optimize the date for making an appointment with a dental healthcare professional, and/or evaluate an orthodontic index, in particular selected from the orthodontic indices listed in the definition of an orthodontic index below, preferably an orthodontic index indicating if the user has reached occlusion class n° I for the canines, and/or the user has reached occlusion class n° I for the molars, and/or the anterior spaces of the patient are closed, and/or all the spaces resulting from the removal of a tooth are closed, and/or the user has an overjet which is normal, preferably comprised between 1 and 3 mm, and/or the user has an overbite which is normal, preferably comprised between 1 and 3 mm, and/or the median lines of the lower and upper arches are offset, and/or the user does not have a lateral offset of the upper arch in relation to the lower arch, and/or during the latter two instances of monitoring, no movement of a tooth has been detected, and/or all the temporary teeth have fallen out, and/or or an orthodontic index which evaluates in quantitative terms, and/or evaluates the temporary change in:

the occlusion class for the canines, and/or the occlusion class for the molars, and/or the anterior spaces of the patient, and/or the spaces resulting from the removal of a tooth, and/or the overjet, and/or the overbite, and/or the offset between the median lines of the lower and upper arches, and/or the lateral offset of the upper arch in relation to the lower arch, and/or the movement of a tooth during the latter two instances of monitoring, and/or evaluate the effectiveness of an active orthodontic treatment, and/or measure the activity of an active orthodontic appliance; and/or measure a drop in effectiveness of a passive orthodontic appliance; and/or compare the positioning of the user's teeth, at the updated instant, with the positioning of said teeth as represented by a target theoretical model, preferably an intermediate model representing said teeth in an anticipated position, according to a treatment plan, for a final step or for an intermediate step of the orthodontic treatment, or intermediate "set-up"; and/or evaluate the necessity of correcting or adapting the orthodontic treatment, for example by designing and manufacturing a new series of orthodontic aligners within the scope of an orthodontic treatment using orthodontic aligners, or by changing the type of orthodontic treatment, for example to change from a treatment using brackets to a treatment using orthodontic aligners, or vice versa; and/or measure a change in shape of the denture of the patient between two dates separated by the occurrence of an impact on the teeth or by the use of a dental device intended for the treatment of sleep apnea, or by the occurrence of a graft in the mouth of the patient;

in step a), the model acquired using the cellphone is segmented so as to define a plurality of models of teeth, and then said step b) is performed so as to define at least one dimensional value for each tooth model, defined as the updated model for said step b);

in step a), the user acquires, preferably using one and the same cellphone, said acquired model and one or more updated images, preferably photos in color, preferably in realistic colors, and, in step b), information relating to a dimension and/or to the appearance of one or more objects, preferably teeth, represented on the one or more updated images is determined, and then said information is used to supplement and/or correct said dimensional value and/or said appearance value determined on the basis of the updated model;

in step a), the acquired model comprises less than 500 points.

The invention also relates to:

a computer program and, in particular, a specialist application for a cellphone, comprising program code instructions for executing step a), and preferably step b), and preferably step c), when said program is run by a computer, a computer medium on which such a program is recorded, for example a memory or a CD-ROM, and a portable scanner, in particular incorporated in a cellphone, on which such a program is loaded.

The invention thus relates to a portable scanner, preferably integrated in a cellphone, that is able to implement the acquisition of step a), and preferably one or more correction and/or simplification methods described in the present description, and preferably step b), and more preferably still step c).

Definitions

A "user" is understood to mean any person for whom a method according to the invention is implemented, whether this person is sick or not and undergoing an orthodontic treatment or not. A "dental healthcare professional" is understood to mean any person qualified to provide dental healthcare, including in particular an orthodontist and a dentist.

An "orthodontic treatment" is all or part of a treatment intended to modify the shape of a dental arch (active orthodontic treatment) or to maintain the shape of a dental arch, in particular after an active orthodontic treatment ends (passive orthodontic treatment).

The orthodontic indices are indices which make it possible synthetically to evaluate the shape and/or the change in shape of the dental arches. They may be specific to one arch or to the set of two arches ("inter-arch" indices). The following can be cited by way of example:

the overbite, the overjet, the size, in particular Nance's index, deviation of the inter-incisal environments, the canine and/or molar occlusion classes, an irregularity index, in particular Little's index, anterior open bite, lateral open bite, lingual posterior crossbite, buccal posterior crossbite, an ideal archwire length, the presence or absence of interdental spaces, an index of the leveling of the curve of Spee, the presence of significant rotation, for example greater than 10°, on certain teeth, and the combinations of these indices and their changes. Examples of orthodontic indices are those used to define the ABO (American Board of Orthodontics) Discrepancy Index.

An "orthodontic appliance" is an appliance worn or intended for wear by a user. An orthodontic appliance may be intended for a therapeutic or prophylactic treatment, but also an esthetic treatment. An orthodontic appliance may be in particular an archwire-and-bracket appliance, or an orthodontic aligner, or an auxiliary appliance of the Carriere Motion type.

An "arch" or "dental arch" is understood to mean all or part of a dental arch.

An "image" is understood to mean a digital representation in two dimensions, such as a photograph or an image extracted from a film. An image is made up of pixels.

A "model" is understood to mean a digital three-dimensional model. A model consists of a set of voxels. It conventionally comprises a grid made up of points connected by segments of a straight line, that is to say an assembly of triangles.

A "tooth model" is a three-dimensional digital model of a tooth. A model of a dental arch can be segmented so as to define tooth models for at least some of the teeth, preferably for all the teeth represented in the model of the arch. The tooth models are therefore models within the model of the arch.

A "model of an arch" is a model representing at least part of a dental arch, preferably at least 2, preferably at least 3, preferably at least 4 teeth.

A model, in particular a model of an arch or of a tooth, is "hyper-realistic" when someone observing it has the impression they are observing the modeled object itself. In particular, the colors of the model are those of the modeled object.

A "rough" model is understood to mean a model resulting from a scan and possibly corrected according to the invention, but the color of which has not been modified to make it hyper-realistic.

The "type" of a modeled object, and in particular of the updated object, defines the nature of this object. The object may be in particular of the "tooth" or "arch" or "gum" type. The object may also be a subgroup of teeth, for example the group of incisors or the group of teeth bearing one or more tooth numbers, or an arch subgroup, for example the upper arch.

A "classification criterion" is an attribute of a modeled object, in particular an arch or a tooth, which makes it possible to classify it. For example, the classification criterion may be an occlusion class, a range for a dimension (for example height, width, concavity, inter-canine distance, inter-premolar width, inter-molar width, arch length, arch perimeter) of the modeled object, the age, the gender, the pathology, or an orthodontic treatment of the person who possesses the modeled object, an orthodontic index, in particular selected from the orthodontic indices listed above, or a combination of these criteria.

The use of a classification criterion makes it possible in particular to select modeled objects which have similar or identical features. Advantageously, it makes it possible to form a learning base well suited to the object that a neural network is intended to process. For example, if a neural network is intended to correct tooth models representing teeth having the number 14, it is preferable to train it with a learning base comprising only records relating to n° 14 teeth. The tooth number is then a classification criterion.

A "standard configuration" is the positioning of a model, in space, in a predetermined orientation and with a predetermined scale. To compare the shape of two models representing an object, for example an arch or a tooth, the two models can be disposed in the standard configuration. Standardization methods for disposing and dimensioning a model in a standard configuration are well known. To compare the shape of two models, it is possible in particular to use an iterative closest point algorithm (described in https://en.wikipedia.org/wiki/Iterative_Closest_Point).

The "segmentation" of a model of an arch into "tooth models" is an operation for delimiting and rendering autonomous the representations of the teeth (tooth models) in the model of the arch. There are computational tools for manipulating the tooth models of an arch model. An example of software for manipulating the tooth models and creating a treatment scenario is the Treat program, described on the webpage https://en.wikipedia.org/wiki/Clear_aligners #cite_note-invisalignsystem-10.

"Statistical processing" is processing which, when applied to a dataset, makes it possible to determine the features specific to that set, for example a mean, a standard deviation, or a median value. Statistical processing tools are well known to those skilled in the art.

"Metaheuristic" methods are known optimization methods. Within the scope of the present invention, they are preferably selected from the group formed by:

evolutionary algorithms, preferably selected from: evolution strategies, genetic algorithms, differential evolution algorithms, estimation of distribution algorithms, artificial immune systems, Shuffled Complex Evolution path reconstruction, simulated annealing, ant colony algorithms, particle swarm optimization algorithms, taboo searching, and the GRASP method;

the kangaroo algorithm, the Fletcher-Powell method, the noise method, stochastic tunneling, random restart hill-climbing, the cross entropy method, and methods that are hybrids between the metaheuristic methods cited above.

A "match" or "fit" between two objects refers to a measure of the difference, or "distance", between these two objects. A match is greatest ("best fit") when this difference is minimal.

A "neural network" or "artificial neural network" is a set of algorithms well known to those skilled in the art. In order to be able to operate, a neural network has to be trained by a learning process called "deep learning", from a learning base.

A "learning base" is a base of computer records suitable for training a neural network. The quality of the analysis performed by the neural network depends directly on the number of records in the learning base. Conventionally, the learning base comprises more than 1000, preferably more than 10 000 records.

The training of a neural network is adapted to the desired aim, and does not pose any particular difficulty to those skilled in the art. Training a neural network consists in confronting it with a learning base containing information about first objects and second objects that the neural network has to learn to "match", that is to say connect with one another.

The training may be performed from a "paired" learning base or learning base "with pairs", consisting of "pair" records, that is to say each comprising a first object for the input of the neural network, and a second corresponding object for the output of the neural network. It is also said that the input and the output of the neural network are "paired". Training the neural network with all of these pairs teaches it to provide, from any object similar to the first objects, a corresponding object similar to the second objects.

The article "Image-to-Image Translation with Conditional Adversarial Networks" by Phillip Isola Jun-Yan Zhu, Tinghui Zhou, Alexei A. Efros, Berkeley AI Research (BAIR) Laboratory, UC Berkeley, illustrates the use of a paired learning base.

The function of a "reference" is to serve as a base for measuring one or more distances. A reference may be for example a three-dimensional, for example orthonormal, reference system. The three-dimensional reference system is preferably fixed in relation to the model in question. If the model represents an arch, it may for example have its origin at the center of the user's buccal cavity. In particular, the three-dimensional reference system is preferably independent of the position and orientation of the portable scanner.

The dimensions (length, width, height) of an arch are conventionally measured considering that the arch is in a horizontal plane. Then, the height direction Y is the vertical direction. The width direction X is the transverse direction for the user, which extends from the user's right to their left. The length direction Z is the depth direction for the user, which extends from the user's front to their rear.

The dimensions (length, width, height) of a tooth are conventionally measured considering that the arch is in a horizontal plane. Then, the height direction Y' is the vertical direction. The width direction X' is the direction of the largest dimension of the tooth when observed from the front, perpendicularly in relation to the height direction. The length direction Z' is the direction perpendicular to the directions Y' and X'.

According to the international convention of the World Dental Federation, each tooth of a dental arch has a predetermined number. The tooth numbers defined by this convention are recalled in FIG. 6.

A "notable point" is a point on an arch model or tooth model that can be identified, for example the apex of the tooth or at the point of a cuspid, an interdental contact point, that is to say a point of contact between one tooth and an adjacent tooth, for example a mesial or distal point on the incisal margin of a tooth, or a point in the center of the crown of the tooth, or "barycenter".

An "angulation" is an orientation of the optical axis of the portable scanner in relation to the user, during the acquisition of the model in step a).

A 3D scanner, or "scanner", is a device for obtaining a model of a tooth or of a dental arch. It conventionally uses a structured light and, on the basis of various images and preferably by making particular points on these images match, forms a 3D model.

More specifically, the portable scanner projects the structured light onto the patient's teeth while acquiring said images. The scanner may project a luminous pattern onto the teeth. The deformation of this pattern makes it possible to spatially interpret the scene.

Conventionally used techniques that may be cited include the projection of a 1-dimensional or 2-dimensional pattern, multistripe laser triangulation (MLT), and digital fringes and the modulated phase technique.

As an alternative or in addition to the projection of structured light, the portable scanner projects modulated light onto the patient's teeth while acquiring said images. The projected light is then dynamic and the camera of the scanner measures the variation in the light reflected over time in order to deduce therefrom the distance traveled by the light. Conventionally used techniques that can be cited include in particular the modulated phase technique.

Analysis of the images makes it possible to construct the model.

The images may be of the same type as the images acquired by conventional intraoral 3D optical scanners.

The images are representations of the observed scene, in the present case the patient's teeth, but their nature is specific to the nature of the light source illuminating the scene. The images are preferably not photos representing the scene realistically, as a person would observe it directly. The maximum difference in shape between the model acquired using the scanner and the scanned object, true to scale, is inversely proportional to the performance of the scanner. It is referred to as "acquisition resolution" or "accuracy" of the scanner. The smaller the resolution is, the more faithful the model is to reality.

A LIDAR is particularly well suited to the invention since it makes it possible to extraorally acquire an accurate model of the arch, on the part of the patient themselves, the laser light being projected directly onto the patient's teeth.

A professional scanner preferably has an accuracy of less than 5/10 mm (that is to say that the maximum difference in shape between the model acquired using the scanner and the actual scanned object, true to scale, is less than 5/10 mm), preferably less than 3/10 mm, preferably less than 1/10 mm, preferably less than 1/50 mm, preferably less than 1/100 mm and/or greater than 1/500 mm.

A "cellphone" or "mobile phone" refers to a device of iPhone® type. Such a device typically weighs less than 500 g, or less than 200 g, is provided with a photographic image capturing device comprising a lens allowing it to take films or photos, or even a scanner allowing it to acquire three-dimensional digital models. A cellphone is also capable of exchanging data with another device more than 500 km away from the cellphone, and is capable of displaying the films, photos or models it has made it possible to acquire on a screen.

A "retractor", or "dental retractor", is a device intended to push back the lips. It comprises an upper rim and a lower rim, and/or a right-hand rim and a left-hand rim, extending around a retractor opening and intended to be introduced between the teeth and the lips. In the use position, the user's lips press against these rims such that the teeth are visible through the retractor opening. A retractor thus makes it possible to observe the teeth without being hampered by the lips.

However, the teeth do not rest on the retractor, meaning that the user is able, by turning their head relative to the retractor, to modify the teeth that are visible through the opening of the retractor. They may also modify the spacing between their dental arches. In particular, a retractor does not press against the teeth so as to space the two jaws apart from one another, but against the lips.

In one embodiment, a retractor is configured so as to elastically space the upper and lower lips apart from one another so as to leave the teeth visible through the retractor opening.

In one embodiment, a retractor is configured such that the distance between the upper rim and the lower rim, and/or between the right-hand rim and the left-hand rim, is constant.

Retractors are described, for example in PCT/EP2015/074896, U.S. Pat. No. 6,923,761, or US 2004/0209225.

The "use position" is the position in which the user acquires the model acquired in step a). When use is made of a support to rigidly fix the portable scanner, the support is partially introduced into the user's mouth, as illustrated in FIGS. 2 and 3.

The "mouth closed" position is the position of occlusion in which the teeth of the upper and lower arches of the patient are in contact. A "mouth open" position is an open position of the mouth, in which the teeth of the upper and lower arches of the patient are not in contact.

The method (apart from the operation of acquisition using the portable scanner) according to the invention is implemented by a computer, preferably exclusively by a computer.

A "computer" denotes a data processing unit which includes an assembly of multiple machines having data processing capabilities. This unit may notably be integrated in the portable scanner, or in a cellphone with the integrated portable scanner, or be a computer of PC type or a server, for example a server remote from the user, for example the "cloud" or a computer disposed on the premises of a dental healthcare professional. The cellphone and the computer then comprise communication means for exchange with one another, notably for sending the updated model, optionally corrected and/or simplified, and/or one or more dimensional values determined according to the invention.

Conventionally, a computer comprises in particular a processor, a memory, a human-machine interface, conventionally comprising a screen, a module for communication via the Internet, via Wi-Fi, via Bluetooth® or via the telephone network. Software configured to implement a method of the invention is loaded into the memory of the computer. The computer may also be connected to a printer.

"First", "second" are used for clarity purposes.

Similarly, for clarity purposes:

"base" refers to a model used in the preferred simplification method;

"reference" refers to a model used in step b) to evaluate a dimensional value or an appearance value, or at an instant at which it is predicted that the object modeled by the reference model will have the shape or appearance of this model;

"correction" refers to a model or to an instant used in a preferred correction method;

"updated" refers to step a), and in particular to the model originating from step a);

"historical" refers to one or more models acquired before the updated instant, in particular modeling an arch or tooth of a "historical" individual different than the user;

"optimum" refers to a model which, from among an assembly of models, has the shape closest to the updated model.

"Vertical", "horizontal", "right(-hand)", "left(-hand)", "front" or "from the front", "behind", "above", "below" refer to a user standing vertically upright.

"Comprising" or "having" or "exhibiting" are to be interpreted non-restrictively unless indicated otherwise.

BRIEF DESCRIPTION OF THE FIGURES

Further features and advantages of the invention will become more apparent from reading the following detailed description and from studying the appended drawing, in which:

FIG. 1 schematically shows an exemplary kit according to the invention;

FIG. 2 schematically shows the kit according to the invention in a use position, the user being seen from the front;

FIG. 3 schematically shows the kit according to the invention in a use position, the user being seen from the side;

FIG. 4 shows an acquired model, with three different acquisition resolutions;

FIG. 5 is an example of the acquired model, after processing to segment the tooth models; an example of a tooth model is colored in dark gray;

FIG. 6 illustrates the numbering of the teeth used in the dental sector;

FIG. 7 illustrates an acquisition method according to the invention;

FIG. 8 illustrates a first correction method according to the invention;

FIG. 9 illustrates a second correction method according to the invention;

FIG. 10 schematically shows an example of a portable scanner in one embodiment of the invention;

FIG. 11 presents various shots providing complementary data; and

FIG. 12 illustrates a device for implementing the image acquisition method of FIG. 7.

In the various figures, identical references are used
to denote similar or identical objects.

DETAILED DESCRIPTION

The aim of a method according to the invention, illustrated in FIG. 7, is to quickly provide a digital three-dimensional model of a user's arch, or a part of this arch, that is to say an "updated model".

In step a), at an updated instant, the user generates the "acquired model" using a portable scanner 6.

Preferably, the acquired model represents at least 2, preferably at least 3, preferably at least 4 teeth, preferably all the teeth of the arch.

A portable scanner is an autonomous scanner, in particular in that it has its own integrated energy source, conventionally a battery, and in that its weight allows it to be manipulated by hand.

Preferably, the portable scanner weighs less than 1 kg, preferably less than 500 g, preferably less than 200 g, and/or more than 50 g.

Preferably, the largest dimension of the portable scanner is less than 30 cm, 20 cm or 15 cm, and/or greater than 5 cm.

The portable scanner preferably has an acquisition resolution less than 10 mm, preferably less than 5 mm, preferably less than 3 mm, preferably less than 2 mm, preferably less than 1 mm, preferably less than 1/2 mm, preferably less than 1/5 mm, preferably less than 1/10 mm.

The portable scanner is preferably configured such that the acquired model comprises more than 5000 and/or less than 200 000 or less than 150 000 points.

FIG. 4 shows examples of arch models 8 acquired with a portable scanner comprising 5000, 11 500 and 154 000 points, respectively.

The portable scanner 6 may be integrated in a cellphone 12, as in FIG. 1, or communicate with a cellphone. Step a) can thus be implemented easily by the user. The cellphone also makes it possible to transfer the updated model to a remote computer.

The updated instant may be during an orthodontic treatment undergone by the user or outside any orthodontic treatment.

In step a), the user preferably holds the portable scanner in the hand. Preferably, it is not immobilized, for example by means of a structure resting on the ground, for example a tripod. Preferably, the user's head is not immobilized.

In one embodiment, the user scans the dental arcade without using any device other than the portable scanner.

In a preferred embodiment, they use a tool to part their lips and better expose the dental arch to the portable scanner. The tool may be for example a spoon introduced into their mouth.

In one embodiment, they use a retractor and/or a buccal support which they introduce partially into their mouth.

Support for the Portable Scanner

In a particularly advantageous embodiment, in step a), the user uses a kit 10 comprising the portable scanner 6 and a support 14 (FIG. 1), making it possible at the same time to part the lips of the user to leave the teeth free, and to facilitate the positioning and orientation of the portable scanner 6 in relation to the teeth.

The support 14 preferably takes the overall shape of a tubular body which has an opening, referred to as "oral opening" Oo, is intended to be introduced into the mouth of the patient, and of which the opposite opening, referred to as "acquisition opening", faces the lens of the portable scanner, rigidly fixed, preferably removably, to the support 14.

Preferably, the acquisition opening also faces a flash of the portable scanner, this making it possible to use it to illuminate the user's teeth during the acquisition.

The support 14 makes it possible to define a spacing between the portable scanner and the oral opening Oo and to orient the portable scanner in relation to the oral opening. Advantageously, in the use position, the data acquired by the portable scanner 6 through its lens, the acquisition opening and the oral opening are thus acquired at a predetermined distance from the user's teeth and in a predefined orientation. Preferably, the support is configured such that this spacing and this orientation are constant.

Preferably, the support 14 has:

a tubular retractor 16 which defines the oral opening Oo and preferably comprises a rim 22 which extends radially outward, around the periphery of the oral opening Oo, and is intended to be introduced between the lips and the teeth of the user, and an adapter 18 to which the portable scanner 6 is fixed, for example clamped between two jaws $24_1$ and $24_2$, as illustrated in FIG. 1, the adapter 18 being rigidly fixed to the retractor 16, preferably removably, for example by means of a clip 20, or made in one piece with the retractor, such that the lens of the portable scanner can "see" the oral opening.

The maximum height $h_{22}$ of the rim 22 is preferably greater than 3 mm and less than 10 mm. To acquire the acquired model, the user assembles the tubular retractor 16 with the adapter 18 by means of the clip 20, and then the portable scanner is assembled on the adapter 18 such that the portable scanner can perform a scan through the tubular retractor 16 and the adapter 18. The user then introduces that end of the tubular retractor that is opposite the portable scanner into their mouth by inserting the rim 22 between their lips and teeth. The lips thus rest on the tubular retractor 16, on the outside of the latter, this making it possible to clearly see the teeth through the oral opening Oo.

In the use position obtained, as illustrated in FIGS. 2 and 3, the teeth do not rest on the support, such that the user U, by turning the head in relation to the support, can modify the teeth that are visible by the portable scanner through the oral opening. They may also modify the spacing between their dental arches. In particular, the support parts the lips, but does not press on the teeth so as to space the two jaws apart from one another.

The acquired model may represent all or part of a dental arch or the two dental arches.

Segmentation of the Acquired Model

In one embodiment, the model of the arch acquired with the portable scanner is segmented, preferably to define at least one tooth model 30. In one embodiment, the updated model is thus reduced to a part of the acquired model, preferably reduced to a tooth model.

Preferably, steps b) and c) are then implemented successively for each tooth model.

The segmentation of a model may implement any known segmentation method.

The correction of the updated model, possibly originating from a segmentation of the acquired model, consists in modifying it to better match the object that it models. To this end, it is possible notably to improve the resolution of the model and/or supplement it and/or give it more realistic colors, for example to make it hyper-realistic, and/or to clean it up. The cleaning up of the model consists in eliminating those parts of the model that do not model the targeted object, for example by eliminating the representation of an orthodontic bracket when the targeted object is a tooth or eliminating defects resulting from the acquisition operation, in particular to clean up artefacts owing to saliva during the acquisition.

Correction

The updated model is preferably subjected to data processing for correction. The correction of the updated model may be carried out before or after a simplification.

In a preferred embodiment, illustrated in FIG. 8, the updated model is compared to a "correction model" and then corrected as a function of the results of this comparison.

Preferably, the following steps are followed when the model to be corrected is a tooth model:

i) creating a historical library comprising more than 1000 tooth models, referred to as "historical tooth models", and attributing a tooth number to each historical tooth model;

ii) analyzing the tooth model that is to be corrected, so as to determine the number of the tooth modeled by said tooth model that is to be corrected;

iii) searching the historical library for a historical tooth model that has the same number and is the best fit with said tooth model to be corrected, or "optimum tooth model";

iv) modifying the tooth model to be corrected on the basis of information relating to the optimum tooth model, the modification possibly comprising a replacement of the tooth model that is to be corrected with the optimum tooth model.

In step i), a historical library preferably comprising more than 2000, preferably more than 5000, preferably more than 10 000 and/or less than 1 000 0000 historical tooth models is created.

A historical tooth model may in particular be obtained from a model of a dental arch of a "historical" patient that was obtained with a scanner. This arch model may be segmented in order to isolate the representations of the teeth, that is to say the tooth models, as in FIG. 5. The historical library therefore contains historical tooth models and the numbers of the teeth modeled by these historical tooth models.

In step ii), the tooth model to be corrected is analyzed to determine its number.

The tooth numbers are conventionally attributed in accordance with a standard rule. All that is necessary, therefore, to determine the numbers of the other tooth models is to know this rule and the number of a modeled tooth.

In a preferred embodiment, the shape of the tooth model to be corrected is analyzed so as to define its number. This shape recognition is preferably performed by means of a neural network. Preferably, use is made of a neural network, preferably selected from the "Object Detection Networks", for example from the following neural networks: R-CNN (2013), SSD (Single Shot MultiBox Detector: Object Detection network), Faster R-CNN (Faster Region-based Convolutional Network method: Object Detection network), Faster R-CNN (2015), SSD (2015), RCF (Richer Convolutional Features for Edge Detection) (2017), SPP-Net, 2014, Over-Feat (Sermanet et al.), 2013, GoogleNet (Szegedy et al.), 2015, VGGNet (Simonyan and Zisserman), 2014, R-CNN (Girshick et al.), 2014, Fast R-CNN (Girshick et al.), 2015, ResNet (He et al.), 2016, Faster R-CNN (Ren et al.), 2016, FPN (Lin et al.), 2016, YOLO (Redmon et al.), 2016, SSD (Liu et al.), 2016, ResNet v2 (He et al.), 2016, R-FCN (Dai et al.), 2016, ResNext (Lin et al.), 2017, DenseNet (Huang et al.), 2017, DPN (Chen et al.), 2017, YOLO9000 (Redmon and Farhadi), 2017, Hourglass (Newell et al.), 2016, Mobile-Net (Howard et al.), 2017, DCN (Dai et al.), 2017, RetinaNet (Lin et al.), 2017, Mask R-CNN (He et al.), 2017, RefineDet (Zhang et al.), 2018, Cascade RCNN (Cai et al.), 2018, NASNet (Zoph et al.), 2019, CornerNet (Law and Deng), 2018, FSAF (Zhu et al.), 2019, SENet (Hu et al.), 2018, ExtremeNet (Zhou et al.), 2019, NAS-FPN (Ghiasi et al.), 2019, Detnas (Chen et al.), 2019, FCOS (Tian et al.), 2019, CenterNet (Duan et al.), 2019, EfficientNet (Tan and Le), 2019, AlexNet (Krizhevsky et al.), 2012, Cbnet (2020), Point-gnn (2020), MDFN (2020), CADN (2021).

Preferably, the neural network is trained by supplying it with tooth models as input and the associated tooth number as output. The neural network thus learns to supply a tooth number for a tooth model that has been presented to it as input.

It is then possible to modify the tooth model to be corrected on the basis of a historical tooth model having the same number.

In step iii), the historical library is searched, from among the historical tooth models having the same number as the tooth model to be corrected, for the historical tooth model which is the best fit with the tooth model to be corrected. This historical tooth model is described as "optimum tooth model".

The "fit" is a measure of the difference in shape between the historical tooth model and the tooth model that is to be corrected. The difference in shape may be for example a mean distance between the historical tooth model and the tooth model that is to be corrected after they have been disposed in a standard configuration.

Preferably, it is considered that the best fit, or "best match", is achieved when the cumulative Euclidean distance between the points on the historical tooth model and those on the tooth model that is to be corrected is lowest.

In step iv), the tooth model to be corrected is modified on the basis of information relating to the optimum tooth model, which is used as correction model.

For example, the zones of the tooth model to be corrected which, in the standard configuration, are spaced from the optimum tooth model by a distance greater than a first distance threshold, for example more than 1 mm, can be replaced with the zones of the optimum tooth model which face them, and/or the "white" zones of the tooth model to be corrected, that is to say the undefined zones, which face zones of the optimum tooth model that are not white can be replaced with these zones of the optimum tooth model.

The modification of the tooth model to be corrected can also consist in replacing the tooth model to be corrected with the optimum tooth model.

Preferably, steps i) to iv) are performed for each segmented tooth model in the acquired model.

The method above can be applied to an updated model representing a dental arch. In steps ii) and iii), the classification criterion for the updated model is adapted as a result. Instead of being the tooth number, the classification criterion may be for example one or more attributes relating to an arch, for example the width of the arch, or to the two arches. The classification criterion may be in particular selected from those listed above in the definition of a classification criterion. The updated model may be submitted to a neural network trained for this by means of a learning base. The neural network may in particular be selected from among the following networks: Shape Inpainting using 3D Generative Adversarial Network and Recurrent Convolutional Networks (2017), Deformable Shape Completion with Graph Convolutional Autoencoders (2018), Learning 3D Shape Completion Under Weak Supervision (2018), PCN: Point Completion Network (2019), TopNet: Structural Point Cloud Decoder (2019), RL-GAN-Net: A Reinforcement Learning Agent Controlled GAN Network for Real-Time Point Cloud Shape Completion (2019), Cascaded Refinement Network for Point Cloud Completion (2020), PF-Net: Point Fractal Network for 3D Point Cloud Completion (2020), Point Cloud Completion by Skip-attention Network with Hierarchical Folding (2020), GRNet: Gridding Residual Network for Dense Point Cloud Completion (2020), and Style-based Point Generator with Adversarial Rendering for Point Cloud Completion (2021).

For example, each record in the learning base may comprise:

an incomplete model of an object, for example
   of a dental arch, or
   of a tooth model, and
the same model, but complete.

Preferably, the objects modeled in the records belong to one and the same class defined by means of a classification criterion. For example, if these objects are teeth, the tooth number of the tooth models is preferably identical for all the records in the learning base.

Preferably, use is made of a neural network specializing in the generation of images, for example:
Cycle-Consistent Adversarial Networks (2017),
Augmented CycleGAN (2018),
Deep Photo Style Transfer (2017),
FastPhotoStyle (2018),
pix2pix (2017),
Style-Based Generator Architecture for GANs (2018),
SRGAN (2018),
WaveGAN 2020,
GAN-LSTM 2019,

CSGAN 2021,

DivCo 2021.

After having been trained with this learning base by being supplied, successively for each record, the incomplete model and, as output, the corresponding complete model, the neural network can transform an incomplete model into a complete model.

The complete model is used as "correction model".

The correction model can be used to perform quality control during the acquisition of the acquired model, that is to say to check that this acquisition has not generated defects. A defect is a part of the acquired model that does not correctly represent the dental arch or arches. For example, the model may have roughnesses or indentations which do not exist in reality, that is to say on the dental arch or arches.

The correction of the acquired model can also be used to eliminate such defects resulting from the acquisition operation.

Cleaning up

Cleaning up the updated model is preferably performed independently of the modification method above (steps i) to iv)). The aim is to process the updated model in order to make the representation of an external object disappear, but also in order to replace the representation with a surface which as faithfully as possible represents the surface of the arch that is covered by that object.

In a preferred embodiment, illustrated in FIG. 9, the updated model is cleaned up so as to eliminate from it the representation of an object external to the user, for example an orthodontic bracket, partially masking at least the object that is to be modeled, for example a tooth, by following the following steps:

i') defining:

a first certain zone formed by points on the updated model representing the object that is to be modeled, for example a tooth, with an accuracy greater than 90%, or "first certain points", and a first uncertain zone, constituting the remainder to 100% of the updated model;

ii') extrapolating the first certain zone, on the basis of the sole first certain zone, so as to define, in the region of the first uncertain zone, a first reconstructed zone, and then defining:

a second certain zone formed by points in the first uncertain zone that are spaced apart from the first reconstructed zone by a distance less than a threshold distance, or "second certain points"; and a second uncertain zone, constituting the remainder to 100% of the first uncertain zone;

iii') extrapolating the aggregate formed by the first and second certain zones, on the basis of the sole aggregate, so as to define, in the region of the second uncertain zone, a second reconstructed zone, and then replacing the second uncertain zone with the second reconstructed zone, so as to obtain a clean updated model.

These operations advantageously make it possible to eliminate the representation of the external object from the updated model and to obtain a clean updated model representing the object that is to be modeled with good accuracy.

The external object may notably be all or part of an orthodontic appliance, a crown, an implant, a bridge, an elastic band or a veneer. It may also be a foodstuff, a drop of saliva, all or part of a tool.

In step i'), the representation of the external object is isolated. More specifically, the points of the updated model which are, virtually certainly, representations of points on the arch are identified.

Algorithms for detecting objects in images are well known to those skilled in the art. Preferably, use is made of a neural network, preferably selected from the "Object Detection Networks", for example from those listed above.

These neural networks are capable, after training, of detecting the points on the updated model which represent points on the arch, or "first certain points", with an accuracy greater than an accuracy threshold greater than or equal to 90%. The set of these points, referred to as "first certain zone", constitutes a fraction of the updated model. The points on the updated model that are not in the first certain zone together form the "first uncertain zone".

Preferably, the accuracy threshold is greater than 95%, preferably greater than 98%, preferably greater than 99% and/or less than 99.99%.

The training of a neural network to detect an object in an image is not difficult for those skilled in the art. For example, it is possible to supply the neural network with arch models as input and the same arch models on which the zones representing the arch and the zones representing an external object have been identified as output. It thus learns to define these zones on an arch model.

The aim of the following steps is to fill out the "first white zone" of the updated model that appears if the first uncertain zone is eliminated.

In step ii'), the first certain zone is used to define a surface that will fill out said first white zone. This surface is referred to as "first reconstructed zone".

The techniques for performing this extrapolation are well known. An example that can be cited is WENDLAND, Holger. Piecewise polynomial, positive definite and compactly supported radial functions of minimal degree. *Advances in computational Mathematics,* 1995, vol. 4, no 1, p. 389-396.

To refine the reconstruction of the surface of the arch masked by the external object, the points of the first uncertain zone that are close to the first reconstructed zone are then identified. These points are therefore points on the updated model that are close to a surface extrapolated from points representing points on the arch with virtual certainty.

It is considered that these points on the updated model, or "second certain points", are also, with high accuracy, points representing points on the arch. The set of these points is referred to as "second certain zone". These points are therefore points on the updated model that were discarded by the analysis of step i'), but that are retained because they are close to a surface extrapolated from points that were retained by the analysis of step i').

The points on the updated model that do not belong to the first certain zone or the second certain zone together form the "second uncertain zone".

The fit of a point in the first uncertain zone with the first reconstructed zone can be evaluated by a measure of the Euclidean distance between this point and this first reconstructed zone. It is considered that a point in the first uncertain zone should be part of the second certain zone if this distance is less than a distance threshold.

If the model is on a scale of 1, that is to say represents the modeled object with the real dimensions of that object, the threshold distance is preferably greater than 0.1 mm and/or less than 1 mm.

The threshold distance can also be determined by an analysis of the distribution of said Euclidean distances between the points in the first uncertain zone and the first reconstructed zone, for example as a function of the mean and the standard deviation of these distances. A dynamic calculation using a method of the "3-sigma rule" type can be implemented, for example.

In step iii'), the aim is to replace the second uncertain zone with a second reconstructed zone which best corresponds to the surface of the arch. To this end, the first and second certain zones are extrapolated in the region of the second uncertain zone.

It is particularly notable that the extrapolation is not based on the sole first certain zone, but on the aggregate of the first and second certain zones. Tests have shown that this extrapolation thus makes it possible to obtain a second reconstructed zone representing the surface of the arch with high reliability.

The extrapolation in step iii') can use the same methods as those implemented in step ii'). It may also use different methods.

The first and second certain zones and the second reconstructed zone constitute the clean updated model, on which the representation of the external objects has been eliminated.

Correction of the Appearance

Preferably, the updated model is made hyper-realistic, preferably by means of a neural network. The updated model may be submitted to a neural network trained for this by means of a learning base, as described for in example http://cs230.stanford.edu/projects_winter_2020/reports/32639841.pdf.

For example, each record in the learning base may comprise:

a rough model of an object, for example
    of a dental arch, or
    of a tooth model, and
the same model, but hyper-realistic.

The rough models preferably have a similar appearance to that of the updated model. They may be scans, preferably performed using an identical or similar scanner to the portable scanner used in step a).

The rough models may for example have been made hyper-realistic by projecting photos. Preferably, the objects modeled in the records belong to one and the same class defined by means of a classification criterion. For example, if these objects are teeth, the tooth number of the tooth models is preferably identical for all the records in the learning base.

Preferably, use is made of a neural network specializing in the generation of images, for example:

Cycle-Consistent Adversarial Networks (2017),
Augmented CycleGAN (2018),
Deep Photo Style Transfer (2017),
FastPhotoStyle (2018),
pix2pix (2017),
Style-Based Generator Architecture for GANs (2018),
SRGAN (2018).

After having been trained with the learning base by being supplied, successively for each record, the rough model as input and the hyper-realistic model as output, the neural network can transform a rough model into a hyper-realistic model.

By virtue of the correction methods described above, an updated model can advantageously be transformed into an updated model representing the modeled object, for example the real arch, with a high degree of realism.

Simplification

Before use, for example during a step b), the updated model, possibly corrected, can be simplified, in particular to facilitate the processing in step b). The simplification may also be performed before or after the possible correction, or between two instances of correction processing.

The updated model, preferably corrected, is preferably displayed on a screen, preferably on the screen of the cellphone when the latter has the integrated portable scanner and/or on a screen in the office of a dental healthcare professional.

One or more of the segmentation and/or correction and/or clean-up and/or appearance correction and/or simplification operations described above can be implemented in the portable scanner, preferably in the cellphone incorporating the portable scanner or communicating with an acquisition tool, or in a data processing center communicating with said cellphone, to which said cellphone has sent the acquired model or the updated model.

In step b), at least one value of a dimensional parameter of the updated model, or "dimensional value", and/or at least one value of an appearance parameter of the updated model, or "appearance value", is determined.

Step b) can be implemented in the cellphone or in a processing center, which is remote from the cellphone and to which the cellphone sends the updated model.

The updated model used in step b) can be the acquired model, that is to say the rough model as generated by the portable scanner, or a part of the acquired model, for example resulting from computer segmentation of the acquired model, or said acquired model after correction and/or simplification, or said part of the acquired model after correction and/or simplification.

A "dimensional value" is a value which depends on the shape of the updated model. This value is that of a "dimensional parameter", which may notably be selected from the following:

a dimension of the updated model, for example the width, the length or the height of the dental arch or of a tooth;

a distance from a point on the updated model to a reference, or a parameter derived from these dimensions and distances, for example an orthodontic index, a canine/molar occlusion class, a measure of an overbite or an overjet, a tooth number, or an indication of the presence or absence of a tooth.

The dimensional value may be measured on the updated model or be obtained from one or more measurements taken on the updated model.

For example, it is possible to measure a spacing between two teeth, the position from a notable point to a reference system, for example orthonormal reference system, which is fixed in relation to the updated object (arch or tooth in particular) or in relation to another tooth, for example to evaluate the alignment of one tooth in relation to the other teeth, the offset of a tooth in relation to the others or in relation to a predetermined position in the reference system, the positioning of one or more teeth in relation to a fixed or removable orthodontic appliance positioned on the teeth or the soft tissues, the size index or irregularity index of the arch, the malalignment of one tooth in relation to the other teeth or in relation to the gum, deformation of a tooth, for example decay depth, a deformation of the gum, the width of the arch or the relative position of one arch with respect to the other.

The dimensional value may also be a measure of a difference in shape between the updated model and a reference model. In particular, it is possible to compare the shapes and/or the positions of teeth in the updated model and in a reference model.

A "appearance value" is a value which depends on the appearance of the surface of the updated model. This value is that of an "appearance parameter", which may notably be selected from the following: a color, a reflectance, a transparency, a reflectivity, a shade, a translucence, an opalescence, an indication as to the presence of tartar, plaque or food deposits on the tooth.

The appearance value may also be a measure of a difference in appearance between the updated model and a reference model. In particular, it is possible to compare the appearances of teeth in the updated model and in a reference model.

The reference model is selected as a function of the targeted application.

For example, if the aim is to check whether the dental situation is normal at the updated instant, that is to say to verify that it does not require intervention by a dental healthcare professional, notably for therapeutic or esthetic reasons, the reference model may be a model which represents an object of the same type as the updated object, or even represents the updated object, in a dental situation considered to be normal at the updated instant.

The reference model may be representative of a set of individuals, preferably comprising more than 100 individuals, preferably more than 1000 individuals and/or less than 1 000 0000 individuals, for example a tooth from a typodont if the updated object is a tooth, or an arch corresponding to the mean arch shape for the set of individuals if the updated object is an arch.

The reference model may be a model which represents an object of the same type as the updated object, preferably represents the updated object, but in a position and/or with a shape and/or with an appearance which is that of the updated object anticipated for a reference instant coming before or after the updated instant or at the same time as the updated instant.

The reference instant may in particular be a step of an orthodontic treatment undergone by the user (for example at the start or end of the orthodontic treatment or in an intermediate step of the orthodontic treatment, or intermediate "set-up", or "staging").

The temporal interval between the updated and reference instants may be longer than one week, preferably longer than 2 weeks, 4 weeks, 6 weeks, 2 months and/or less than 6 months.

The reference model may be obtained by means of a scanner, for example the user using the portable scanner, preferably by means of a professional scanner, or be obtained by construction on the basis of photos of the arch and a library of historical teeth, as described in EP18184486, which is equivalent to U.S. Ser. No. 16/031,172.

The reference model is preferably obtained by computer simulation, such that it represents the dental arch in the intended configuration at the reference instant, notably at the end of an orthodontic treatment or at the updated instant.

For example, the result may be a modification of an initial model, for example generated by means of a scan of the user's arch, preferably generated more than one week before the updated instant, for example at the start of an orthodontic treatment. The initial model is conventionally segmented so as to define tooth models. Moving the tooth models then makes it possible to simulate the progress of the orthodontic treatment.

An example of software for manipulating the tooth models and creating a treatment scenario is the Treat described on program, the webpage https://en.wikipedia.org/wiki/Clear_aligners #cite_note-invisalignsystem-10. U.S. Pat. No. 5,975,893A also describes the creation of a treatment scenario.

In one embodiment, the following is performed:
segmentation of the reference model produced before the updated instant or of the updated model, so as to generate tooth models,
movement of one or more of said tooth models, without deforming the tooth models, until a modified model which best matches the shape of the updated or reference model, respectively, is obtained,
evaluation of the difference in positioning (determination of at least one dimensional value) of at least one tooth model between its position in the reference or updated model, respectively, and its position in the modified model.

In step c), the dimensional value and/or the appearance value determined in step b) is/are used, in particular to make a decision as to whether an action for therapeutic or esthetic purposes is necessary and/or to contribute to the determination of this action.

The dimensional value and/or the appearance value, and preferably the updated model, can be presented to the user, for example by being displayed on the screen of their cellphone.

In addition or alternatively, they can also be sent, preferably by radio, preferably by way of a cellphone with the integrated portable scanner or communicating with the acquisition tool, to a dental healthcare professional, in particular an orthodontist or to a remote computer communicating with the cellphone.

Preferably, the dimensional value and/or the appearance value is/are interpreted, preferably by a computer, preferably by a cellphone with the integrated portable scanner, and a recommendation is presented to the user, preferably on the screen of their cellphone.

Use of Updated Images

In one embodiment, which is particularly advantageous, in step a), the user acquires one or more "updated" images, preferably extraoral images, in addition to the updated model. Preferably, the user uses the cellphone implemented to acquire the acquired model.

Preferably, the updated images are photographs or images extracted from a film. They are preferably in color, preferably true color. Preferably, they represent the dental arches substantially as seen by the operator of the device for acquiring these images.

The information provided by the updated images makes it possible to supplement that provided by the acquired model. The information can in particular relate to a dimension and/or the appearance of one or more objects, preferably teeth, represented on the one or more updated images. In particular, the analysis of an updated image, preferably by computer, makes it possible to confirm and/or correct a dimensional value and/or an appearance value determined from the updated model, and/or to supplement the teaching drawn from the updated model.

For example, the updated model may allow the detection of a cavity on the surface of a tooth and an updated image can reveal a darker zone at the location of this cavity. The updated image thus confirms the presence of the cavity. It also makes it possible to confirm the position of the cavity. The analysis of the model and the updated images thus makes it possible to detect decay and monitor change in it.

The updated images can also very reliably provide information about the appearance of the teeth, for example about their colors. Projected onto the updated model, they thus make it possible to color the surface of the updated model very realistically.

Further preferably, multiple updated images taken from different angles, that is to say with different orientations of the acquisition device in relation to the user's buccal cavity, are acquired. For example, the set of updated images may comprise 6 images representing the dental arches "seen from the front", "seen from the front right", "seen from the right", "seen from the front left", "seen from the left" and "seen from below", respectively.

Preferably, at least one updated image is acquired from the front of the user (front view). Preferably, at least one updated image is acquired from the user's right, and at least one updated image is acquired from the user's left.

The set of updated images comprises preferably more than two, preferably more than three, preferably more than 5, preferably more than 6 and/or less than 30, preferably less than 20, preferably less than 15, preferably less than 10 updated images.

In one embodiment, the updated images are processed to generate a said correction model and/or a said reference model. For this, all the conventional techniques can be implemented.

The acquisition of two models at the updated instant, specifically the updated model and a model obtained from updated images, and then the comparison of these models advantageously makes it possible to best utilize the 3D and 2D representations supplied by the portable scanner and the image acquisition device, respectively.

The method may be implemented independently of any orthodontic treatment, notably in order to check that the position and/or the shape of the teeth are not "abnormal", that is to say where they do not meet a therapeutic or esthetic standard. Preferably, an appointment with a dental healthcare professional should then be made. The method may be implemented before an orthodontic treatment.

Upstream of an orthodontic treatment, the method may notably be implemented to acquire the positioning and the anatomy of the teeth in the future and initiate the manufacture of an interceptive orthodontic appliance or a customized orthodontic appliance, for example transparent orthodontic aligners, or design a customized treatment using an archwire and brackets.

The method can be implemented during an orthodontic treatment, in particular to control its progression, with step a) being implemented less than 3 months, less than 2 months, less than 1 month, less than one week, less than 2 days before the start of the treatment, that is to say after the fitting of an appliance intended to correct the positioning of the user's teeth, referred to as "active retainer appliance".

During an orthodontic treatment, the method may be implemented to acquire an updated model of the teeth and allow the manufacture of a new orthodontic appliance, for example an implant, an orthodontic aligner, or a vestibular orthodontic appliance.

Preferably, the updated model generated in step a) and/or the one or more values determined in step b) is/are sent to a dental healthcare professional to assist in establishing a diagnosis.

The method may also be implemented after an orthodontic treatment, to verify that the positioning of the teeth has not changed for the worse ("relapse"). Step a) is then preferably implemented less than 3 months, less than 2 months, less than 1 month, less than one week, less than 2 days after the end of the treatment, that is to say after the fitting of an appliance intended to keep the teeth in position, referred to as "passive retainer appliance".

The dimensional value is preferably used to detect a relapse, and/or determine a rate of change in positioning of the teeth, and/or optimize the date for making an appointment with a dental healthcare professional, and/or evaluate the effectiveness of an orthodontic treatment, and/or evaluate the change in the positioning of teeth toward a reference model corresponding to a determined positioning of the teeth, in particular an improved positioning of the teeth, and/or modify an ongoing orthodontic treatment, for example by manufacturing a new series of orthodontic aligners, and/or in dentistry, and/or visualize and/or measure and/or detect plaque, and/or decay, and/or a microcrack, and/or wear, for example resulting from bruxism or the implementation of an active or passive orthodontic appliance, notably in the event of breakage or detachment of an orthodontic archwire;

visualize and/or measure and/or detect a change in volume, in particular while the teeth are growing or following intervention by a dental healthcare professional, for example a deposit of adhesive on the surface of the teeth;

evaluate the opportunity for interceptive treatment, before any orthodontic treatment, notably to evaluate the advantage of an orthodontic treatment.

The appearance value is preferably used to detect or evaluate a position or a shape of an instance of staining or decay.

In a particularly advantageous embodiment, both the dimensional value and the appearance value are used. Advantageously, the method can thus be used to accurately monitor the change in certain pathologies, in particular staining, demineralization, or decay, in localized fashion.

As is presently clear, the invention provides a method allowing a particular user, for example a patient, to generate a model of one or more of their arches, or one or more of their teeth. They do not need any specific equipment, apart from the portable scanner, which is preferably integrated in their cellphone.

The acquired model may be acquired without introducing the portable scanner into the user's mouth, that is to say extraorally. The processing of the updated model in order to correct it makes it possible in particular to correct it in order to model regions of the mouth which the portable scanner has not accessed, for example in an interproximal space.

In one embodiment, in step a), the acquired model is rough. It may in particular represent a "3D skeleton" of the user's one or more dental arches and comprise only less than 500 points, less than 200 points, less than 100 points or less than 50 points and/or more than 10 points. The processing of the updated model in order to correct it, in particular using a neural network or on the basis of a historical library, advantageously makes it possible to reconstruct a much more accurate model of the user's one or more dental arches.

In one embodiment, the portable scanner is partially introduced into the user's mouth. Advantageously, the back faces of the teeth may be scanned.

As shown in FIG. 10, preferably, the portable scanner 6 comprises a cellphone 12 and an acquisition tool 31 communicating with the cellphone, preferably by radio, preferably by Bluetooth®. Wired communication is also possible.

The acquisition tool is provided with an acquisition head 32 which can be introduced into the user's mouth. The acquisition head acquires the acquired model and sends it to the cellphone 12, or acquires a signal, for example a set of images, and transfers it to the cellphone 12 such that the latter generates the acquired model from said signal.

Preferably, the acquisition tool does not have a physical link to the cellphone or is connected to the cellphone by a flexible link, for example a wire.

Preferably, the acquisition tool comprises a handle 34 making it easier to manipulate, on the part of the user themselves or one of their relatives, for example in the manner of a toothbrush.

In one embodiment, the acquisition tool is fixed to the cellphone, for example by means of a clip, a self-adhesive tape, clamping jaws, a screw, a magnet, a cover or a flexible band, preferably an elastic band. The fixing can also result from complementarity of shape with the cellphone. For example, the acquisition tool may be fixed to a phone casing.

In one embodiment, the method also implements a measuring head which communicates with the cellphone and is introduced into the user's mouth in order to acquire supplementary data, for example data about the spaces between the teeth the lingual faces of the teeth the palate including, for example, the median palatine suture the soft tissues (sores, benign or malignant lesions, recessions)

the shade of the teeth the presence of decay or staining the state and/or the shape of implants, crowns and/or bridges the state of vestibular or lingual treatment appliances (for example: lingual or vestibular brackets, palate expander or any other treatment auxiliary) or retainer treatment appliances (palatine archwire)

the distances between the various parts of one and the same vestibular or lingual appliance or any other auxiliary state of the anchoring devices (mini-screw type)

distance between the anchoring devices and the appliances present in the mouth soft tissue suture points healing of soft tissues after surgery the curve of Spee the curve of Wilson the distance between canines the distance between molars.

FIG. 11 presents various shots providing supplementary data, in particular about the palate including a median palatine suture (image 1), soft tissue suture points (image 2), distances between the various parts of one and the same vestibular or lingual appliance or any other auxiliary (images 3 and 4), the state and/or the shape of implants, crowns and/or bridges (images 5 and 8), the state of anchoring devices (mini-screw type) and the distance between the anchoring devices and the appliances present in the mouth (image 6), the state of vestibular or lingual treatment appliances (for example lingual or vestibular brackets, palate expander or any other treatment auxiliary) or retainer treatment appliances (palatine archwire) (FIG. 7), the space between the teeth and the healing of soft tissues after surgery (image 9), the lingual faces of the teeth (image 10), the distance between canines and the distance between molars (image 10), the shade of the teeth (image 11), the curve of Spee (image 12), the curve of Wilson (image 13), and the presence of decay or staining (image 14).

The measuring head may be integrated in a measuring tool exhibiting one or more of the features of the acquisition tool. By contrast to the latter, however, the measuring tool does not serve to acquire the acquired model.

The acquired model can then be corrected in particular in order to be supplemented and/or cleaned up and/or made hyper-realistic. The user can send to a dental healthcare professional, possibly to a dental healthcare professional they have never met, a model that the dental healthcare professional can analyze, in particular in order to establish a diagnosis and/or to give advice to the user and/or to define an appointment date.

Of course, the invention is not limited to the embodiments described and shown.

The methods for correcting and simplifying the updated model that are described above are inventions, independently of the description method.

Improvements

Beyond the method described above and more generally, the invention also relates to a method for acquiring at least one image of at least one dental arch of a user by means of a cellphone and an acquisition tool comprising an acquisition head provided with a camera, preferably able to be introduced into the user's mouth, during which method the acquisition head:

acquires said image and sends it to the cellphone, or acquires a signal and sends it to the cellphone such that said cellphone generates the image from said signal, autonomously or using a computer with which said cellphone communicates.

Said at least one image is preferably a photo, preferably a photo representing the dental arch realistically, as a person would observe it directly.

The image can be used to generate a model as according to step a), but the image acquisition method according to the invention is no longer limited to this particular embodiment, since the image can be used for other purposes. This method is therefore described below as "general method".

Insofar as a feature described above for step a) is technically compatible with the general method, however, it may be applied to this method.

The cellphone and the acquisition tool are preferably exclusively manipulated by the user.

The acquisition can be performed extraorally, with the camera of the acquisition tool not entering the user's mouth. The acquisition can be performed intraorally, with the camera of the acquisition tool entering the user's mouth.

In one embodiment, the acquisition tool is fixed to the cellphone, for example by means of a clip, a self-adhesive tape, clamping jaws, a screw, a magnet, a cover or a flexible band, preferably an elastic band. The fixing can also result from complementarity of shape with the cellphone. For example, the acquisition tool may be fixed to a phone casing.

Preferably, however, the cellphone and the acquisition tool communicate with one another but can be moved independently of one another. Preferably, the cellphone and the acquisition tool are not connected to one another by any rigid device, preferably any mechanism, such that the cellphone can be moved in space, preferably in all the spatial dimensions, without necessarily taking the acquisition tool along with it.

Preferably, the screen displays the scene observed by the camera of the acquisition head.

The independence of movement between the cellphone and the acquisition tool makes it possible in particular to use the screen of the cellphone to visualize the scene observed by the camera of the acquisition head without this visualization being hindered by the handling of the acquisition head.

In one embodiment, during the acquisition, the user observes the screen of the cellphone, the cellphone preferably being immovable in relation to the ground, for example placed on a table, and manipulates the acquisition tool. They can thus easily position the acquisition tool in a desired position, preferably for extraoral acquisition. Moreover, this embodiment advantageously allows the user to use the camera of the cellphone that is disposed on the opposite side to the screen, without having to use a mirror.

Preferably, the user acquires at least one image from the front, preferably at least one image from the user's right, and, also preferably, at least one image from the user's left.

Preferably, the user acquires at least one image with the mouth open and at least one image with the mouth closed.

The set of acquired images comprises preferably more than two, preferably more than three, preferably more than 5, preferably more than 6 and/or less than 30, preferably less than 20, preferably less than 15, preferably less than 10 images.

Preferably, the user uses a tool to part their lips and better expose the dental arch to the camera of the acquisition tool. The tool may be for example a spoon introduced into their mouth.

In one embodiment, they use a retractor which they introduce partially into their mouth.

Preferably, the general method comprises, after said acquisition, an analysis of said image in order to define the user's dental situation, and preferably design an active or passive orthodontic treatment plan, and/or to verify the proper progression of an ongoing active or passive orthodontic treatment.

Preferably, the acquisition method comprises, after said analysis of said image, the manufacture of an orthodontic appliance, for example an orthodontic aligner, and preferably sending of said orthodontic appliance to the user.

The aforementioned uses for the updated images can also be applied to the image or images acquired following the general method. Said at least one image is preferably used to detect a relapse, and/or determine a rate of change in positioning of the teeth, and/or optimize the date for making an appointment with a dental healthcare professional, and/or evaluate the effectiveness of an orthodontic treatment, and/or evaluate the change in the positioning of teeth toward a reference model corresponding to a determined positioning of the teeth, in particular an improved positioning of the teeth, and/or modify an ongoing orthodontic treatment, for example by manufacturing a new series of orthodontic aligners, and/or in dentistry, and/or visualize and/or measure and/or detect plaque, and/or decay, and/or a microcrack, and/or wear, for example resulting from bruxism or the implementation of an active or passive orthodontic appliance, notably in the event of breakage or detachment of an orthodontic archwire;

visualize and/or measure and/or detect a change in volume, in particular while the teeth are growing or following intervention by a dental healthcare professional, for example a deposit of adhesive on the surface of the teeth;

evaluate the opportunity for interceptive treatment, before any orthodontic treatment, notably to evaluate the advantage of an orthodontic treatment.

FIG. 12 illustrates a device 6' for implementing such an image acquisition method. This kit comprises a cellphone 12' and an acquisition tool 31' communicating with the cellphone, preferably by radio, preferably by Bluetooth® or WiFi. Wired communication is also possible. The acquisition tool 31' is provided with an acquisition head 32' which can be introduced into the user's mouth. The acquisition head comprises a camera 33' which acquires the image and sends it to the cellphone 12', or acquires a signal and transfers it to the cellphone 12' such that the latter generates the image from said signal.

Preferably, the acquisition tool does not have a physical link to the cellphone or is connected to the cellphone by a flexible link, for example a wire.

Preferably, the acquisition tool comprises a handle 34' making it easier to manipulate, on the part of the user themselves or one of their relatives, for example in the manner of a toothbrush. The cellphone 12' may comprise one or more of the features of the cellphone 12. Preferably, it is not fixed to any support, and in particular to any support fixed to the user such as the support 10 described above, and the user can manipulate it freely.

The invention claimed is:

1. A method for acquiring a model of at least one dental arch of a user, said method comprising the following steps:

a) at an updated instant, acquiring, using a portable scanner and on the part of the user, a digital three-dimensional model of said at least one arch, or "acquired model", and optionally segmenting the acquired model so as to isolate a portion of the model of the arch, so as to obtain an "updated model", the updated model possibly thus being the acquired model or the portion of the acquired model that was isolated by segmentation, the object represented by the updated model being referred to as "updated object", the portable scanner being integrated in a cellphone for said acquisition or comprising a cellphone and an acquisition tool comprising an acquisition head able to be introduced into the mouth of the user, who acquires the acquired model and sends said acquired model to the cellphone, or acquires a signal and sends said signal to the cellphone such that said cellphone generates the acquired model from said signal, autonomously or using a computer with which said cellphone communicates.

2. The method as claimed in claim 1, wherein the cellphone sends the acquired model and/or the updated model to a dental healthcare professional.

3. The method as claimed in claim 1, wherein, in step a), the updated model is subjected to data processing to correct said updated model, the correction optionally comprising a modification of the updated model or a replacement of the updated model with a correction model.

4. The method as claimed in claim 1, wherein, in step a), the updated model is compared with a correction model so as to obtain a measure for a difference in shape between the updated model and the correction model, and then either the updated model is modified so as to reduce said difference in shape or, depending on said measure, the updated model is left unchanged or the updated model is replaced with the correction model, and/or the updated model is submitted to a neural network trained to make a digital three-dimensional model presented to said neural network as input more realistic.

5. The method as claimed in of claim 3, wherein the correction model is a model which is obtained, at a different instant than the updated instant, by a scan of said updated object, or which shows said updated object, respectively, with a shape resulting from a simulation, or a model of an object representative of a set of individuals, said object being of the same type as the updated object.

6. The method as claimed in claim 5, wherein the correction model is:

a model of the updated object that was obtained by a scan using the portable scanner, or a model of the updated object that simulates the shape of said updated object as anticipated for the updated instant, or a model of the updated object that simulates the shape of said updated object as anticipated for an instant referred to as "correction instant", coming after or before the updated instant, the temporal interval between the updated instant and correction instant being longer than one week, or a historical model selected from a historical library comprising more than 1000 historical models representing objects of the same type as the updated object, said selection preferably being guided such that the selected historical model is the historical model which is the best fit in terms of shape with the updated model, or a model obtained by subjecting the historical models from said historical library to statistical processing.

7. The method as claimed in claim 3, wherein, in step a), the updated model is corrected by entering the updated model as input into a neural network trained to correct models, and/or by following the following steps:

i) creating a historical library comprising more than 1000 historical models, each historical model modeling an object of the same type as the updated object, and attributing a value for a classification criterion to each historical model;

ii) analyzing the updated model, so as to determine the value of said classification criterion for the updated object;

iii) searching the historical library for a historical model that has the same value for said classification criterion and is the best fit with said updated model, or "optimum model";

iv) modifying the updated model on the basis of information relating to the optimum model, the modification optionally comprising a replacement of the updated model with the optimum model, and/or by following the following steps:

i') defining:

a first certain zone formed by points on the updated model representing a portion of the patient with an accuracy greater than 90%, or "first certain points", and a first uncertain zone, constituting the remainder to 100% of the updated model;

ii') extrapolating the first certain zone, on the basis of the sole first certain zone, so as to define, in the region of the first uncertain zone, a first reconstructed zone, and then defining:

a second certain zone formed by points in the first uncertain zone that are spaced apart from the first reconstructed zone by a distance less than a threshold distance, or "second certain points"; and a second uncertain zone, constituting the remainder to 100% of the first uncertain zone;

iii') extrapolating the aggregate formed by the first and second certain zones, on the basis of the sole aggregate, so as to define, in the region of the second uncertain zone, a second reconstructed zone, and then replacing the second uncertain zone with the second reconstructed zone, so as to obtain a clean updated model, and/or by submitting the updated model to a trained neural network by supplying said neural network with rough models of objects of the same type as the updated object as input, and said models made hyper-realistic as output.

8. The method as claimed in claim 7, comprising segmenting the acquired model so as to define a plurality of models of teeth, and then, for each tooth model considered to be an updated model, a cycle of steps i) to iv) wherein, in step iv), the optimum model replaces said tooth model in the acquired model.

9. The method as claimed in claim 1, wherein, in step a), the updated model is subjected to data processing in order to simplify said updated model.

10. The method as claimed in claim 1, wherein the portable scanner is a LIDAR.

11. The method as claimed in claim 1, wherein, in step a), the user moves their lips and/or their cheeks apart to make their teeth visible to the portable scanner, and then acquires the acquired model extraorally, without putting the portable scanner in their mouth, even partially.

12. The method as claimed in claim 11, wherein, in step a), the portable scanner is immobilized on a support comprising a rim, the rim being inserted between the user's lips and teeth.

13. The method as claimed in claim 12, wherein the support comprises a tubular retractor which defines an oral opening, said rim extending around the periphery of the oral opening.

14. The method as claimed in claim 1, wherein, in step a), the user horizontally modifies the angulation of the portable scanner.

15. The method as claimed in claim 1, comprising, after step a), the following step:

b) determining at least one value of a dimensional parameter of the updated model, or "dimensional value", and/or of an appearance parameter of the updated model, or "appearance value".

16. The method as claimed in claim 15, wherein the dimensional parameter is selected from the following:

a dimension of the updated model;

a distance from a notable point on the updated model to a reference, and a parameter derived from one or more dimensions of the updated model and/or from one or more distances from one or more notable points on the updated model to said reference, or wherein the appearance parameter is selected from the following: a color, a reflectance, a transparency, a reflectivity, a shade, a translucence, an opalescence, an indication as to the presence of tartar, plaque or food deposits on the tooth.

17. The method as claimed in claim 15, wherein, in order to determine a dimensional value, a distance between a point on the updated model and a reference model disposed, like the updated model, in a standard configuration is measured.

18. The method as claimed in claim 17, wherein the reference model is a model of the updated object that was obtained by a scan using the portable scanner at an instant more than two weeks before the updated instant, or a model of the updated object that simulates the shape of said updated object as anticipated for the updated instant and that has been produced at an instant more than two weeks before the updated instant, or a model of the updated object that simulates the shape of said updated object as anticipated for a reference instant, coming after or before the updated instant, or "reference model", the temporal interval between the updated instant and reference instant being longer than one week, said reference model having been produced more than two weeks before the updated instant, or a historical model selected from a historical library comprising more than 1000 historical models representing objects of the same type as the updated object, or a model obtained by subjecting the historical models from a historical library comprising more than 1000 historical models representing objects of the same type as the updated object to statistical processing, such that the model obtained by statistical processing is representative of a population of individuals.

19. The method as claimed in claim 15, wherein, in step a), the model acquired using the cellphone is segmented so as to define a plurality of models of teeth, and then said step b) is performed so as to define at least one dimensional value for each tooth model, defined as the updated model for said step b).

20. The method as claimed in claim 15, wherein, in step a), the user acquires, using one and the same cellphone, said acquired model and one or more updated images, and, in step b), information relating to a dimension and/or to the appearance of the teeth represented on the one or more updated images is determined, and then said information is used to supplement and/or correct said dimensional value and/or said appearance value.

21. The method as claimed in claim 1, wherein, in step a), the acquired model comprises less than 500 points.

22. The method as claimed in claim 1, wherein, in step a), supplemental data not essential to the generation of the acquired model are acquired by means of a measuring head which communicates with the cellphone and is introduced into the user's mouth.

23. The method as claimed in claim 1, wherein the portable scanner uses a structured light and, on the basis of various images and by making particular points on said images match, forms the acquired model.

24. A kit comprising a portable scanner and a support to which the portable scanner is removably fixed in a position allowing the portable scanner to observe an oral opening defined by the support, said support comprising a rim able to be inserted between the user's lips and teeth for the acquisition of step a) of a method as claimed in claim 1, in a use position in which the portable scanner observes the user's teeth through said oral opening.

\* \* \* \* \*